US012315457B2

(12) United States Patent
Hwang et al.

(10) Patent No.: US 12,315,457 B2
(45) Date of Patent: May 27, 2025

(54) DISPLAY DEVICE HAVING A PLURALITY OF AREAS DRIVEN IN A PLURALITY OF MODES

(71) Applicant: Samsung Display Co., LTD., Yongin-si (KR)

(72) Inventors: Do Yeon Hwang, Yongin-si (KR); Kwang-Min Kim, Yongin-si (KR); Inhyeok Yeo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/409,565

(22) Filed: Jan. 10, 2024

(65) Prior Publication Data

US 2024/0420640 A1 Dec. 19, 2024

(30) Foreign Application Priority Data

Jun. 14, 2023 (KR) ........................ 10-2023-0076448

(51) Int. Cl.

| | |
|---|---|
| ***G09G 3/32*** | (2016.01) |
| ***G09G 3/3233*** | (2016.01) |
| ***G09G 3/3258*** | (2016.01) |

(52) U.S. Cl.

CPC ............. *G09G 3/3258* (2013.01); *G09G 3/32* (2013.01); *G09G 3/3233* (2013.01); (Continued)

(58) Field of Classification Search

CPC ....... G09G 3/32–3291; G09G 2300/02; G09G 2300/026; G09G 2300/0421; G09G 2300/0426; G09G 2300/0443; G09G 2300/0809; G09G 2300/0819; G09G 2300/0852; G09G 2300/0861; G09G 2310/0262; G09G 2310/04; G09G 2310/06; G09G 2310/08; G09G 2320/028; G09G 2358/00; G09G 2380/10

See application file for complete search history.

(56) References Cited

U.S. PATENT DOCUMENTS

| | | | | |
|---|---|---|---|---|
| 2015/0348464 A1* | 12/2015 | In | G09G 3/3233 345/82 |
| 2022/0122500 A1* | 4/2022 | Wai | G09G 3/3233 |

(Continued)

FOREIGN PATENT DOCUMENTS

| | | |
|---|---|---|
| KR | 10-2021-0027719 A | 3/2021 |
| KR | 10-2021-0121933 A | 10/2021 |

(Continued)

*Primary Examiner* — Nathan Danielsen

(74) *Attorney, Agent, or Firm* — Womble Bond Dickinson (US) LLP

(57) ABSTRACT

A display device includes: a display panel including a first area and a second area; and a panel driver configured to drive the display panel, to provide a first mode control signal to pixels in the first area, and to provide a second mode control signal to pixels in the second area, wherein the first area is configured to be driven in a first mode to display an image having a first viewing angle or a second mode to display an image having a second viewing angle narrower than the first viewing angle based on the first mode control signal, and wherein the second area is configured to be driven in the first mode or the second mode based on the second mode control signal.

19 Claims, 18 Drawing Sheets

(52) U.S. Cl.
CPC ................. *G09G 2300/026* (2013.01); *G09G 2300/0426* (2013.01); *G09G 2300/0819* (2013.01); *G09G 2300/0852* (2013.01); *G09G 2300/0861* (2013.01); *G09G 2380/10* (2013.01)

(56) References Cited

U.S. PATENT DOCUMENTS

2023/0217690 A1* 7/2023 Hong .................... G09G 3/3233 345/173
2024/0127760 A1* 4/2024 Cho ...................... G09G 3/3233

FOREIGN PATENT DOCUMENTS

KR 10-2022-0008699 A 1/2022
KR 10-2023-0135710 A 9/2023

* cited by examiner

DISPLAY DEVICE HAVING A PLURALITY OF AREAS DRIVEN IN A PLURALITY OF MODES

CROSS-REFERENCE TO RELATED APPLICATION

The present application claims priority to and the benefit of Korean Patent Application No. 10-2023-0076448, filed on Jun. 14, 2023, in the Korean Intellectual Property Office, the entire disclosure of which is incorporated herein by reference.

BACKGROUND

1. Field

Aspects of some embodiments of the present disclosure relate to a display device.

2. Description of the Related Art

A display device may display visual information to users with images. The display device may be driven in a public mode in which not only users in front but also users at the side (or off center) may view the images, or in a private mode in which only users in front may view the images by controlling a viewing angle of the image displayed on the display device.

Recently, in order to apply to display system used in vehicles, etc., consumer demand for display devices that control the public mode and the private mode for each partial area of a display area is increasing.

The above information disclosed in this Background section is only for enhancement of understanding of the background and therefore the information discussed in this Background section does not necessarily constitute prior art.

SUMMARY

Aspects of some embodiments of the present disclosure relate to a display device. For example, aspects of some embodiments relate to a display device for controlling a viewing angle of an image.

Aspects of some embodiments include a display device in which a viewing angle of an image is controlled.

A display device according to some embodiments may include a display panel which includes a first area and a second area, and a panel driver which drives the display panel, provides a first mode control signal to pixels in the first area, and provides a second mode control signal to pixels in the second area. The first area may be driven in a first mode displaying an image having a first viewing angle or a second mode displaying an image having a second viewing angle narrower than the first viewing angle based on the first mode control signal. The second area may be driven in the first mode or the second mode based on the second mode control signal.

According to some embodiments, the first area and the second area may be driven in the first mode or the second mode independently from each other.

According to some embodiments, each of the first mode control signal and the second mode control signal may include a public gate signal and a private gate signal. According to some embodiments, each of the first area and the second area may be driven in the first mode based on the public gate signal. According to some embodiments, each of the first area and the second area may be driven in the second mode based on the private gate signal.

According to some embodiments, each of the pixels in the first and second areas may includes a first light emitting element which emits light with the first viewing angle, a second light emitting element which emits light with the second viewing angle, an emission transistor turned-on in response to an emission signal, a first mode control transistor connected between the first light emitting element and the emission transistor and turned-on in response to the public gate signal, and a second mode control transistor connected between the second light emitting element and the emission transistor and turned-on in response to the private gate signal.

According to some embodiments, in the second mode, the first light emitting element may not emit light, and the second light emitting element may emit light.

According to some embodiments, in the first mode, the first light emitting element may emit light, and the second light emitting element may not emit light.

According to some embodiments, in the first mode, the first light emitting element may emit light, and the second light emitting element may emit light.

According to some embodiments, each of the pixels in the first and second areas may further include a driving transistor connected between a driving voltage line and a first node and which includes a gate electrode connected to a second node, a write transistor connected between a data voltage line and a third node and turned-on in response to a write gate signal, a compensation transistor connected between the first node and the second node and turned-on in response to a compensation gate signal, an initialization transistor connected between a first initialization voltage line and the second node and turned-on in response to an initialization gate signal, a reference transistor connected between a reference voltage line and the third node and turned-on in response to the compensation gate signal, a first capacitor connected between the second node and the third node, and a second capacitor connected between the driving voltage line and the third node.

According to some embodiments, each of the pixels in the first and second areas may further include a first bypass transistor connected between a second initialization voltage line and a fourth node between the first light emitting element and the first mode control transistor and turned-on in response to a bypass gate signal, and a second bypass transistor connected between the second initialization voltage line and a fifth node between the second light emitting element and the second mode control transistor and turned-on in response to the bypass gate signal.

According to some embodiments, the display panel may further include a peripheral area surrounding the first area and the second area. According to some embodiments, the panel driver may provide a third mode control signal to pixels in the peripheral area. According to some embodiments, the peripheral area may be driven in the first mode or the second mode based on the third mode control signal.

According to some embodiments, the peripheral area may be driven in the first mode only.

According to some embodiments, the display panel may further include a first side area adjacent to at least one side of the first area. According to some embodiments, the panel driver may provide a third mode control signal to pixels in the first side area. According to some embodiments, the first side area may be driven in the first mode or the second mode based on the third mode control signal.

According to some embodiments, the first side area may be driven in the first mode only when the first area is driven in the first mode.

According to some embodiments, the first side area may be driven in the first mode or the second mode when the first area is driven in the second mode.

According to some embodiments, the display panel may further include a second side area adjacent to at least one side of the second area. According to some embodiments, the panel driver may provide a fourth mode control signal to pixels in the second side area. According to some embodiments, the second side area may be driven in the first mode or the second mode based on the fourth mode control signal.

According to some embodiments, the display panel may further include a peripheral area surrounding the first area, the second area, the first side area, and the second side area. According to some embodiments, the panel driver may provide a fifth mode control signal to pixels in the peripheral area. According to some embodiments, the peripheral area may be driven in the first mode or the second mode based on the fifth mode control signal.

According to some embodiments, the panel driver may includes a scan driver which provides scan signals to the pixels in the first and second areas, an emission driver which provides emission signals to the pixels in the first and second areas, a data driver which provides data voltages to the pixels in the first and second areas, and a mode driver which provides the first mode control signal to the pixels in the first area and provides the second mode control signal to the pixels in the second area.

A display device according to some embodiments may include a display panel which includes a plurality of pixels and divided into first to $k^{th}$ areas, where n is a natural number greater than or equal to 2, and a panel driver which drives the display panel and provides first to $k^{th}$ mode control signals to the first to $k^{th}$ areas, respectively. Each of the first to $k^{th}$ mode control signals may include a public gate signal and a private gate signal. Each of the pixels includes a first light emitting element which emits light with a first viewing angle, a second light emitting element which emits light with a second viewing angle narrower than the first viewing angle, an emission transistor turned-on in response to an emission signal, a first mode control transistor connected between the first light emitting element and the emission transistor and turned-on in response to the public gate signal, and a second mode control transistor connected between the second light emitting element and the emission transistor and turned-on in response to the private gate signal.

According to some embodiments, the first to $k^{th}$ mode control signals may be independent from each other.

According to some embodiments, each of the pixels may further include a driving transistor connected between a driving voltage line and a first node and which includes a gate electrode connected to a second node, a write transistor connected between a data voltage line and a third node and turned-on in response to a write gate signal, a compensation transistor connected between the first node and the second node and turned-on in response to a compensation gate signal, an initialization transistor connected between a first initialization voltage line and the second node and turned-on in response to an initialization gate signal, a reference transistor connected between a reference voltage line and the third node and turned-on in response to the compensation gate signal, a first capacitor connected between the second node and the third node, and a second capacitor connected between the driving voltage line and the third node.

In a display device according to some embodiments, the areas of the display panel may be independently driven based on the mode control signals, respectively, so that each of the areas may be independently driven in the first mode (public mode) displaying a wide viewing angle image or the second mode (private mode) displaying a narrow viewing angle image.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
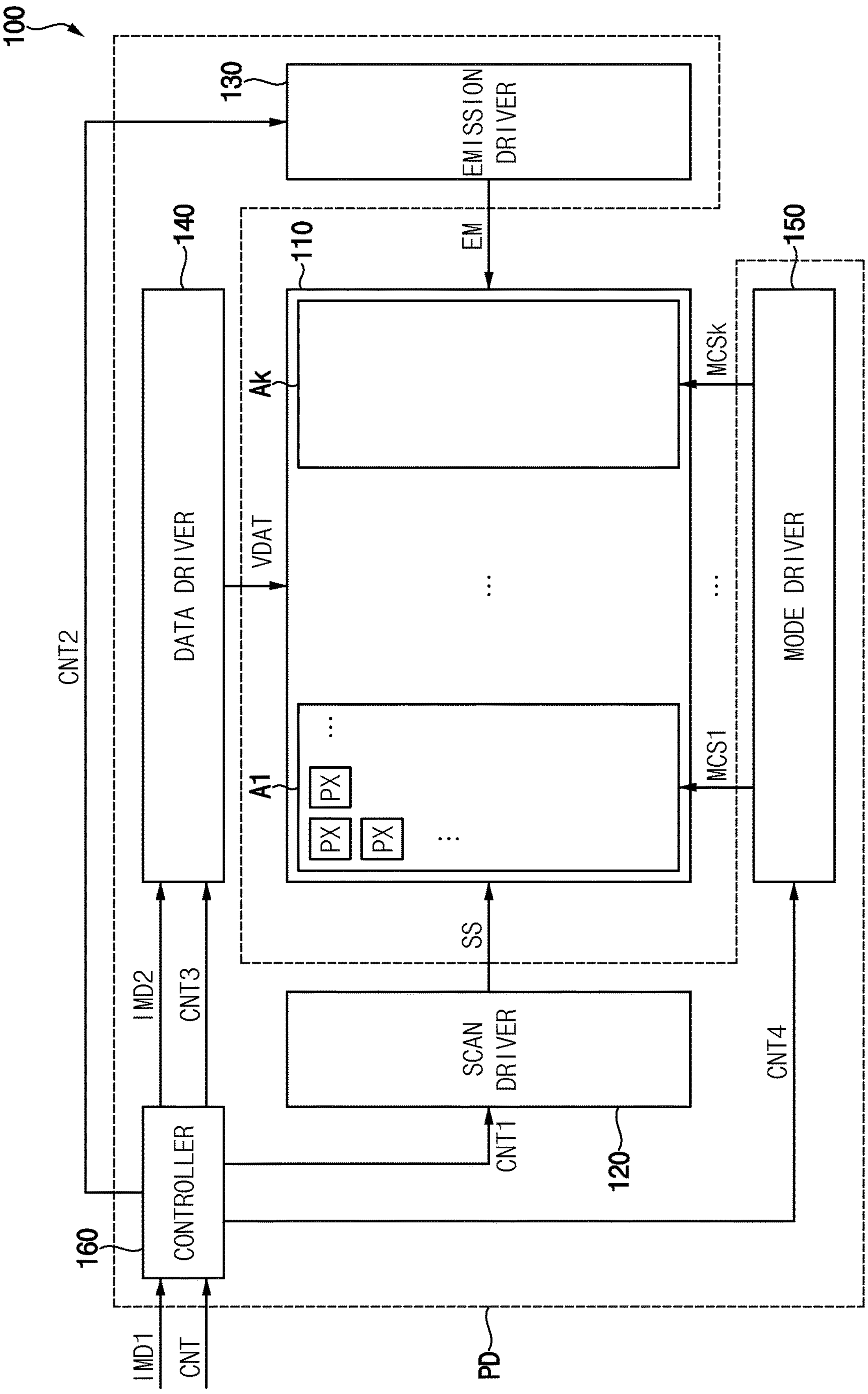
FIG. 1 is a block diagram illustrating a display device according to some embodiments.

Hereinafter, a display device according to some embodiments of the present disclosure will be described in more detail with reference to the accompanying drawings. The same or similar reference numerals will be used for the same elements in the accompanying drawings.

FIG. 1 is a block diagram illustrating a display device 100 according to some embodiments.

Referring to FIG. 1, a display device 100 may include a display panel 110 and a panel driver PD.

The display panel 110 may include pixels PX. According to some embodiments, the pixels PX may include a first pixel emitting light having a first color, a second pixel emitting light having a second color, and a third pixel emitting light having a third color. For example, the first color, the second color, and the third color may be red, green, and blue, respectively.

The display panel 110 may include first to $k^{th}$ (k is a natural number equal to or greater than 2) areas A1-Ak. In other words, the display panel 110 may be divided into the first to $k^{th}$ areas A1-Ak. Each of the first to $k^{th}$ areas A1-Ak may include a plurality of pixels PX.

The panel driver PD may drive the display panel 110. The panel driver PD may provide first to $k^{th}$ mode control signals MCS1-MCSk to the first to $k^{th}$ areas A1-Ak, respectively.

The panel driver PD may include a scan driver 120, an emission driver 130, a data driver 140, a mode driver 150, and a controller 160.

The scan driver 120 may provide scan signals SS to the pixels PX. According to some embodiments, the scan driver 120 may sequentially generate first to $n^{th}$ (n is a natural number equal to or greater than 2) scan signals SS respectively corresponding to first to $n^{th}$ pixel rows based on a first control signal CNT1. The first control signal CNT1 may include a scan clock signal, a scan start signal, etc.

The emission driver 130 may provide emission signals EM to the pixels PX. According to some embodiments, the emission driver 130 may sequentially generate first to $n^{th}$ emission signals EM respectively corresponding to the first to $n^{th}$ pixel rows based on a second control signal CNT2. The second control signal CNT2 may include an emission clock signal, an emission start signal, etc.

The data driver 140 may provide data voltages VDAT to the pixels PX. According to some embodiments, the data driver 140 may generate first to $m^{th}$ (m is a natural number equal to or greater than 2) data voltages VDAT respectively corresponding to first to $m^{th}$ pixel columns based on second image data IMD2 and a third control signal CNT3. According to some embodiments, the second image data IMD2 may include grayscale values respectively corresponding to the pixels PX. The third control signal CNT3 may include a data clock signal, a horizontal start signal, a load signal, etc.

The mode driver 150 may provide first to $k^{th}$ mode control signals MCS1-MCSk to the first to $k^{th}$ areas A1-Ak, respectively. The mode driver 150 may provide a first mode control signal MCS1 to the pixels PX in the first area A1, and may provide a $k^{th}$ mode control signal MCSk to the pixels PX in the $k^{th}$ area Ak. The mode driver 150 may generate the first to $k^{th}$ mode control signals MCS1-MCSk respectively corresponding to the first to $k^{th}$ areas A1-Ak based on a fourth control signal CNT4. The first to $k^{th}$ mode control signals MCS1-MCSk may be independent from each other. The first to $k^{th}$ areas A1-Ak may be independently driven in a first mode (e.g., public mode) displaying an image having a first viewing angle or a second mode (e.g., private mode) displaying an image having a second viewing angle narrower than the first viewing angle based on the first to $k^{th}$ mode control signals MCS1-MCSk, respectively.

The controller 160 may control an operation (or driving) of the scan driver 120, an operation (or driving) of the emission driver 130, an operation (or driving) of the data driver 140, and an operation (or driving) of the mode driver 150. The controller 160 may generate the first control signal CNT1, the second control signal CNT2, the second image data IMD2, the third control signal CNT3, and the fourth control signal CNT4 based on first image data IMD1 and a control signal CNT. According to some embodiments, the first image data IMD1 may include grayscale values respectively corresponding to the pixels PX. The controller 160 may convert the first image data IMD1 into the second image data IMD2. The control signal CNT may include a master clock signal, a vertical synchronization signal, a horizontal synchronization signal, a data enable signal, etc.

Figure 2:
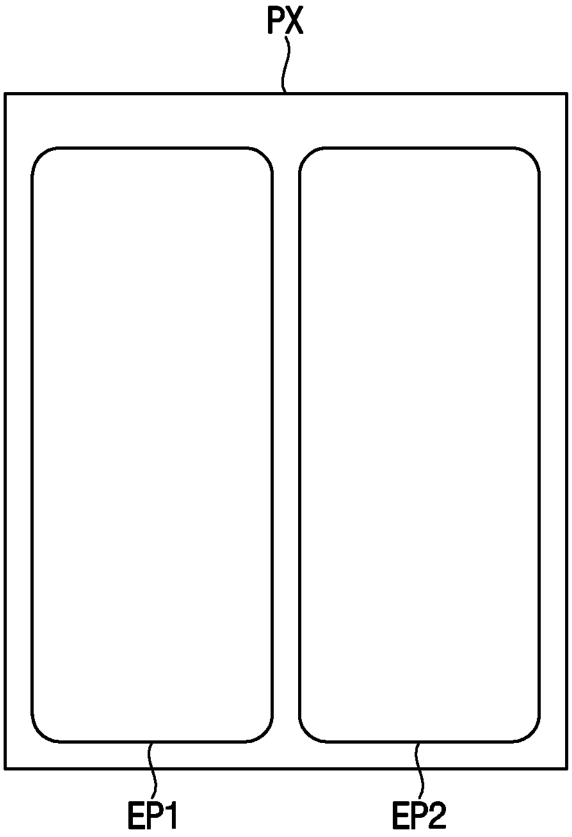
FIG. 2 is a plan view illustrating a pixel according to some embodiments.

FIG. 2 is a plan view illustrating the pixel PX according to some embodiments. The pixel PX in FIG. 2 may be one of the pixels PX included in the display device 100 in FIG. 1.

Referring to FIG. 2, the pixel PX may include a first emission portion EP1 and a second emission portion EP2. The first emission portion EP1 may emit light at a first viewing angle, and the second emission portion EP2 may emit light at a second viewing angle narrower than the first viewing angle.

Figure 3:
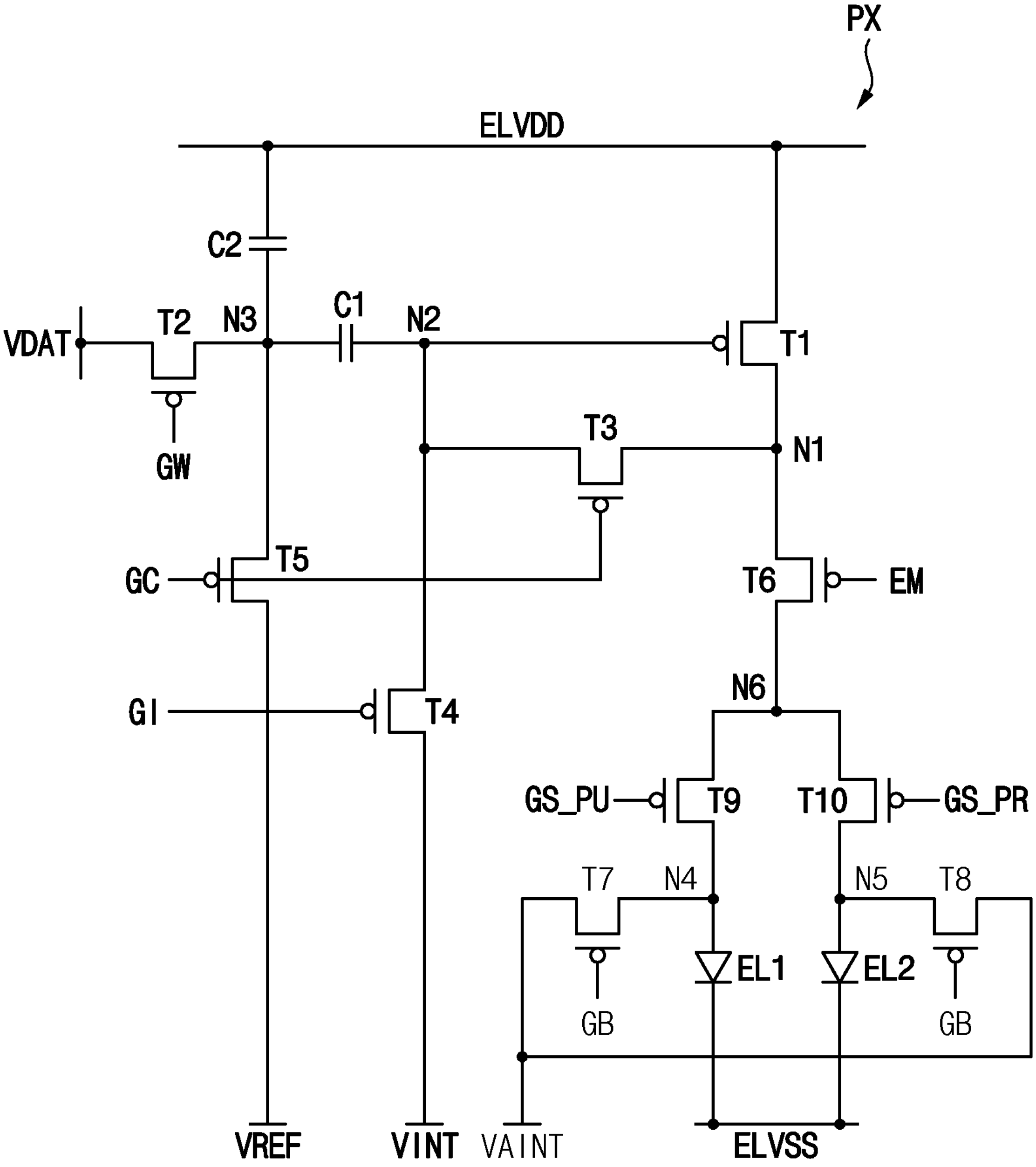
FIG. 3 is a circuit diagram illustrating the pixel in FIG. 2 according to some embodiments.

FIG. 3 is a circuit diagram illustrating the pixel PX in FIG. 2.

Referring to FIGS. 1, 2, and 3, the pixel PX may include a first transistor (driving transistor) T1, a second transistor (writing transistor) T2, a third transistor (compensation transistor) T3, a fourth transistor (initialization transistor) T4, a fifth transistor (reference transistor) T5, a sixth transistor (emission transistor) T6, a seventh transistor (first bypass transistor) T7, an eighth Transistor (second bypass transistor) T8, a ninth transistor (first mode control transistor) T9, a tenth transistor (second mode control transistor) T10, a first capacitor C1, a second capacitor C2, a first light emitting element EL1, and a second light emitting element EL2. The scan signal SS may include a write gate signal GW, a compensation gate signal GC, an initialization gate signal GI, and a bypass gate signal GB. Each of the first to $k^{th}$ mode control signals MCS1-MCSk may include a public gate signal GS_PU and a private gate signal GS_PR.

The first transistor T1 may be connected between a driving voltage line transmitting a driving voltage ELVDD and a first node N1. The first transistor T1 may include a first electrode connected to the driving voltage line, a second electrode connected to the first node N1, and a gate electrode connected to a second node N2. The first transistor T1 may generate a driving current corresponding to a difference between a voltage of the second node N2 and the driving voltage ELVDD.

The second transistor T2 may be connected between a data voltage line transmitting the data voltage VDAT and a third node N3, and may be turned-on in response to the write gate signal GW. The second transistor T2 may include a first electrode connected to the data voltage line, a second electrode connected to the third node N3, and a gate electrode that receives the write gate signal GW. The second transistor T2 may transmit the data voltage VDAT to the third node N3 in response to the write gate signal GW.

The third transistor T3 may be connected between the first node N1 and the second node N2, and may be turned-on in response to the compensation gate signal GC. The third transistor T3 may include a first electrode connected to the first node N1, a second electrode connected to the second node N2, and a gate electrode that receives the compensation gate signal GC. The third transistor T3 may connect the first node N1 and the second node N2 in response to the compensation gate signal GC.

The fourth transistor T4 may be connected between a first initialization voltage line transmitting a first initialization voltage VINT and the second node N2, and may be turned-on in response to the initialization gate signal GI. The fourth transistor T4 may include a first electrode connected to the first initialization voltage line, a second electrode connected to the second node N2, and a gate electrode that receives the initialization gate signal GI. The fourth transistor T4 may transmit the first initialization voltage VINT to the second node N2 in response to the initialization gate signal GI.

The fifth transistor T5 may be connected between a reference voltage line transmitting a reference voltage VREF and the third node N3, and may be turned-on in response to the compensation gate signal GC. The fifth transistor T5 may include a first electrode connected to the reference voltage line, a second electrode connected to the third node N3, and a gate electrode that receives the compensation gate signal GC. The fifth transistor T5 may transmit the reference voltage VREF to the third node N3 in response to the compensation gate signal GC.

The sixth transistor T6 may be connected between the first node N1 and a sixth node N6, and may be turned-on in response to the emission signal EM. The sixth transistor T6 may include a first electrode connected to the first node N1, a second electrode connected to the sixth node N6, and a gate electrode that receives the emission signal EM. The sixth transistor T6 may connect the first node N1 and the sixth node N6 in response to the emission signal EM.

The seventh transistor T7 may be connected between a second initialization voltage line transmitting a second initialization voltage VAINT and a fourth node N4, and may be turned-on in response to the bypass gate signal GB. The seventh transistor T7 may include a first electrode connected to the second initialization voltage line, a second electrode connected to the fourth node N4, and a gate electrode that receives the bypass gate signal GB. The seventh transistor T7 may transmit the second initialization voltage VAINT to the fourth node N4 in response to the bypass gate signal GB.

The eighth transistor T8 may be connected between the second initialization voltage line and a fifth node N5, and may be turned-on in response to the bypass gate signal GB. The eighth transistor T8 may include a first electrode connected to the second initialization voltage line, a second electrode connected to the fifth node N5, and a gate electrode that receives the bypass gate signal GB. The eighth transistor T8 may transmit the second initialization voltage VAINT to the fifth node N5 in response to the bypass gate signal GB.

The ninth transistor T9 may be connected between the sixth node N6 and the fourth node N4, and may be turned-on in response to the public gate signal GS_PU. The ninth transistor T9 may include a first electrode connected to the sixth node N6, a second electrode connected to the fourth node N4, and a gate electrode that receives the public gate signal GS_PU. The ninth transistor T9 may connect the sixth node N6 and the fourth node N4 in response to the public gate signal GS_PU.

The tenth transistor T10 may be connected between the sixth node N6 and the fifth node N5, and may be turned-on in response to the private gate signal GS_PR. The tenth transistor T10 may include a first electrode connected to the sixth node N6, a second electrode connected to the fifth node N5, and a gate electrode that receives the private gate signal GS_PR. The tenth transistor T10 may connect the sixth node N6 and the fifth node N5 in response to the private gate signal GS_PR.

FIG. 3 illustrates embodiments in which each of the first transistor T1, the second transistor T2, the third transistor T3, the fourth transistor T4, the fifth transistor T5, the sixth transistor T6, the seventh transistor T7, the eighth transistor T8, the ninth transistor T9, and the tenth transistor T10 is a P-type transistor (e.g., PMOS transistor), but embodiments according to the present disclosure are not limited thereto. According to some embodiments, at least one of the first transistor T1, the second transistor T2, the third transistor T3, the fourth transistor T4, the fifth transistor T5, the sixth transistor T6, the seventh transistor T7, the eighth transistor T8, the ninth transistor T9, or the tenth transistor T10 may be an N-type transistor (e.g., NMOS transistor).

The first capacitor C1 may be connected between the second node N2 and the third node N3. The first capacitor C1 may maintain a voltage of the second node N2 and a voltage of the third node N3, and electrically couple the second node N2 and the third node N3.

The second capacitor C2 may be connected between the driving voltage line and the third node N3. The second capacitor C2 may maintain the voltage of the third node N3.

FIG. 3 illustrates embodiments in which the pixel PX includes 10 transistors and 2 capacitors, but embodiments according to the present disclosure are not limited thereto. According to some embodiments, the pixel PX may include 5 to 9, 11 or more transistors and/or 1 or 3 or more capacitors. Additionally, according to some embodiments, the pixel PX may include additional components (e.g., transistors, capacitors, etc.) or fewer component without departing from the spirit and scope of embodiments according to the present disclosure.

The first light emitting element EL1 may be connected between the fourth node N4 and a common voltage line transmitting a common voltage ELVSS. The first light emitting element EL1 may be located in the first emission portion EP1. The first light emitting element EL1 may emit light at the first viewing angle.

The second light emitting element EL2 may be connected between the fifth node N5 and the common voltage line. The second light emitting element EL2 may be located in the second emission portion EP2. The second light emitting element EL2 may emit light at the second viewing angle.

According to some embodiments, each of the first light emitting element EL1 and the second light emitting element EL2 may be an organic light emitting diode. According to some embodiments, each of the first light emitting element EL1 and the second light emitting element EL2 may be an inorganic light emitting diode, a micro light emitting diode, or a quantum dot light emitting diode.

Figure 4:
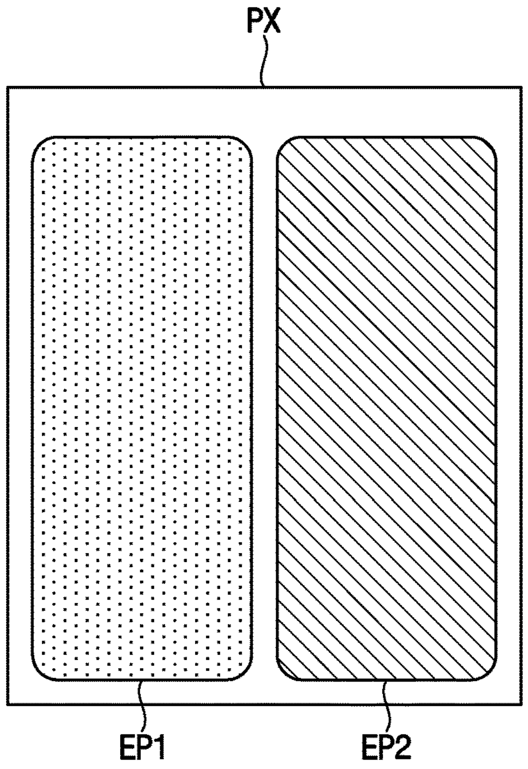
FIGS. 4, 5, and 6 are diagrams for describing an emission of the pixel in FIG. 3 according to some embodiments.
Figure 5:
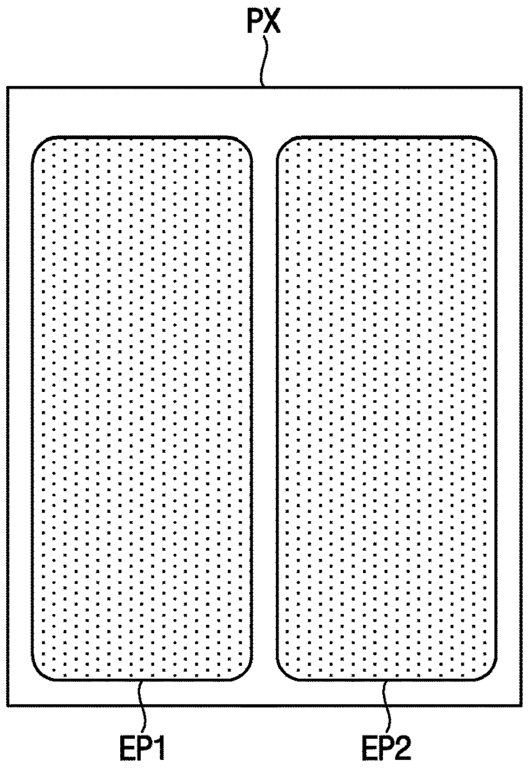
Figure 6:
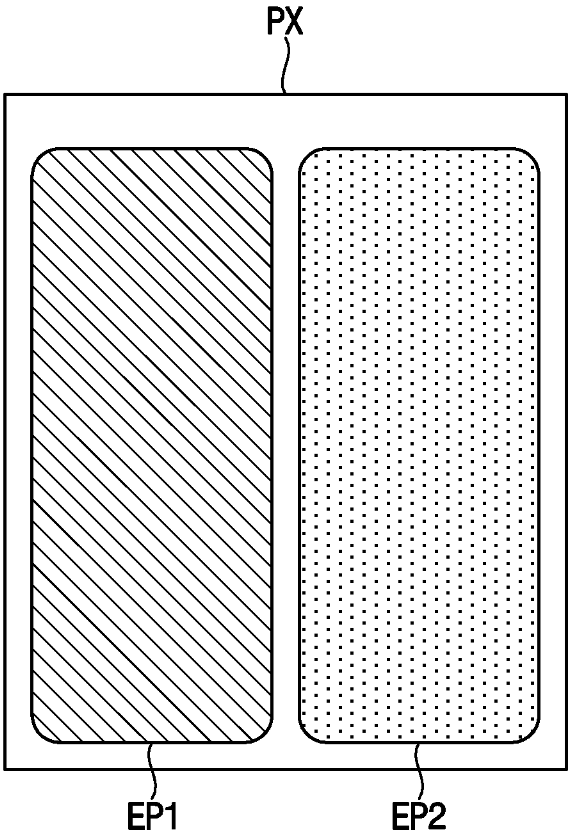

FIGS. 4, 5, and 6 are diagrams for describing an emission of the pixel PX in FIG. 3 according to some embodiments.

Referring to FIGS. 3 and 4, according to some embodiments, in the first mode, the first light emitting element EL1 may emit light, and the second light emitting element EL2 may not emit light. The public gate signal GS_PU having a turn-on voltage level (e.g., a low voltage level) and the private gate signal GS_PR having a turn-off voltage level (e.g., a high voltage level) may be provided to the pixel PX, and accordingly, the ninth transistor T9 may be turned-on and the tenth transistor T10 may be turned-off. The driving current generated by the first transistor T1 may be provided to the first light emitting element EL1 through the ninth transistor T9 when the sixth transistor T6 is turned-on, and the first light emitting element EL1 may emit light at the first viewing angle (wide viewing angle). Accordingly, in the first mode, the pixel PX may emit light at the first viewing angle.

Referring to FIGS. 3 and 5, according to some embodiments, in the first mode, the first light emitting element EL1 may emit light, and the second light emitting element EL2 may emit light. The public gate signal GS_PU having the turn-on voltage level and the private gate signal GS_PR having the turn-on voltage level may be provided to the pixel PX, and accordingly, the ninth transistor T9 may be turned-on, and the tenth transistor T10 may be turned-on. The driving current generated by the first transistor T1 may be provided to the first light emitting element EL1 through the ninth transistor T9 when the sixth transistor T6 is turned-on, and the first light emitting element EL1 may emit light at the first viewing angle. Further, the driving current generated by the first transistor T1 may be provided to the second light emitting element EL2 through the tenth transistor T10 when the sixth transistor T6 is turned-on, and the second light emitting element EL2 may emit light at the second viewing angle (narrow viewing angle). Accordingly, in the first mode, the pixel PX may emit light at the first viewing angle and the second viewing angle.

Referring to FIGS. 3 and 6, in the second mode, the first light emitting element EL1 may not emit light, and the second light emitting element EL2 may emit light. The public gate signal GS_PU having the turn-off voltage level and the private gate signal GS_PR having the turn-on voltage level may be provided to the pixel PX, and accordingly, the ninth transistor T9 may be turned-off, and the tenth transistor T10 may be turned-on. The driving current generated by the first transistor T1 may be provided to the second light emitting element EL2 through the tenth transistor T10 when the sixth transistor T6 is turned-on, and the second light emitting element EL2 may emit light at the second viewing angle. Accordingly, in the second mode, the pixel PX may emit light at the second viewing angle.

Figure 7:
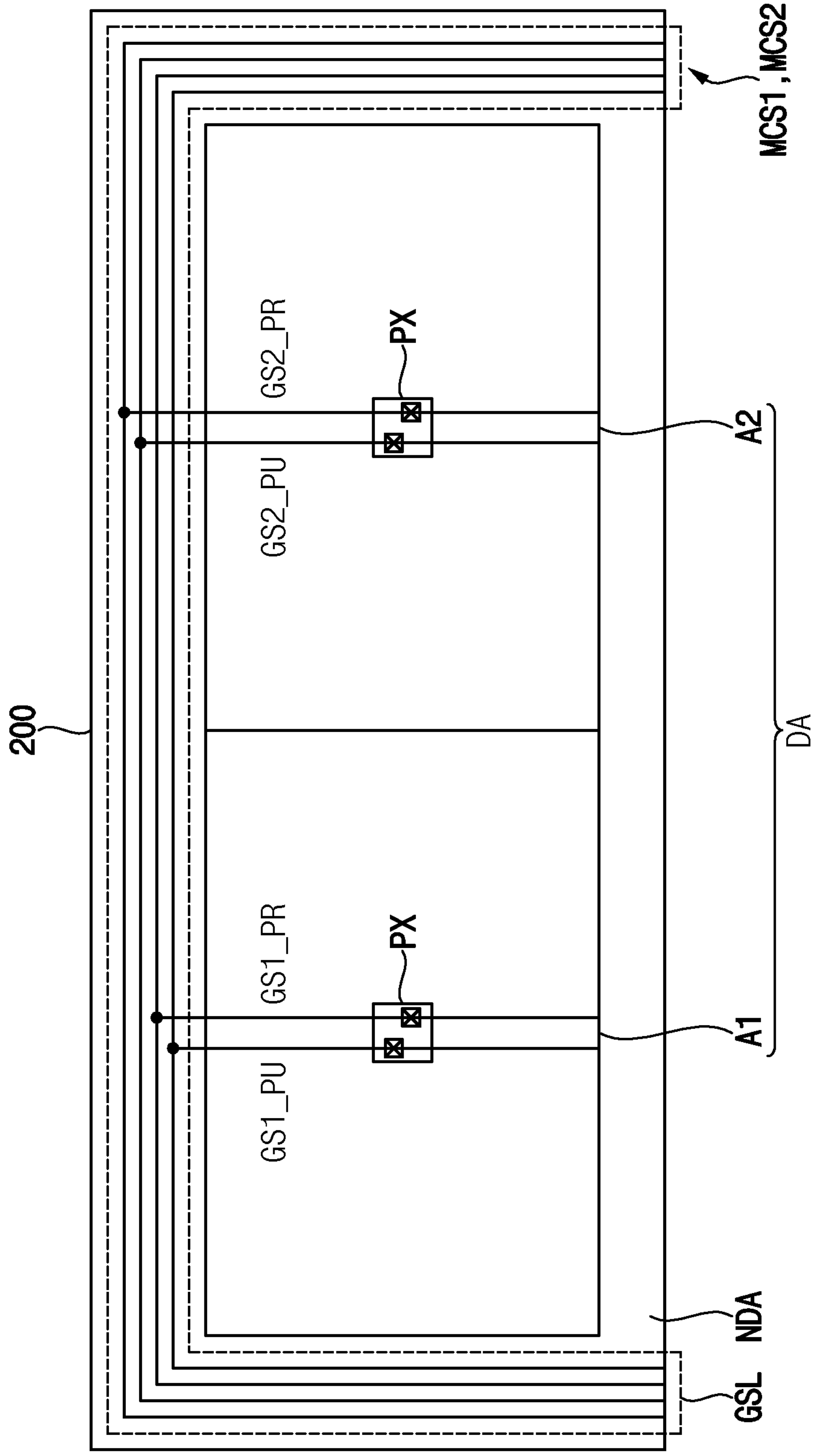
FIG. 7 is a plan view illustrating a display panel according to some embodiments.

FIG. 7 is a plan view illustrating a display panel 200 according to some embodiments. The display panel 200 in FIG. 7 may be an example of the display panel 110 included in the display device 100 in FIG. 1.

Referring to FIGS. 1 and 7, a display area DA of the display panel 200 may include a first area A1 and a second area A2, and each of the first area A1 and the second area A2 may include a plurality of pixels PX. In other words, the display area DA may be divided into the first area A1 and the second area A2. A non-display area NDA of the display panel 200 may surround the display area DA.

The mode driver 150 may provide a first mode control signal MCS1 and a second mode control signal MCS2 to global signal lines GSL located in the non-display area NDA. The first mode control signal MCS1 may include a first public gate signal GS1_PU and a first private gate signal GS1_PR, and the second mode control signal MCS2 may include a second public gate signal GS2_PU and a second private gate signal GS2_PR. The first public gate signal GS1_PU and the first private gate signal GS1_PR may be provided to the pixels PX in the first area A1 through the global signal lines GSL, and the second public gate signal GS2_PU and the second private gate signal GS2_PR may be provided to the pixels PX in the second area A2 through the global signal lines GSL.

The first area A1 may be driven in the first mode or the second mode based on the first mode control signal MCS1. The first area A1 may be driven in the first mode based on the first public gate signal GS1_PU, and may be driven in the second mode based on the first private gate signal GS1_PR. The second area A2 may be driven in the first mode or the second mode based on the second mode control signal MCS2. The second area A2 may be driven in the first mode based on the second public gate signal GS2_PU, and may be driven in the second mode based on the second private gate signal GS2_PR. Accordingly, the first area A1 and the second area A2 may be driven in the first mode or the second mode independently from each other.

FIGS. 8, 9, 10, and 11 are diagrams for describing a driving of the display panel 200 in FIG. 7 according to some embodiments.

Figure 8:
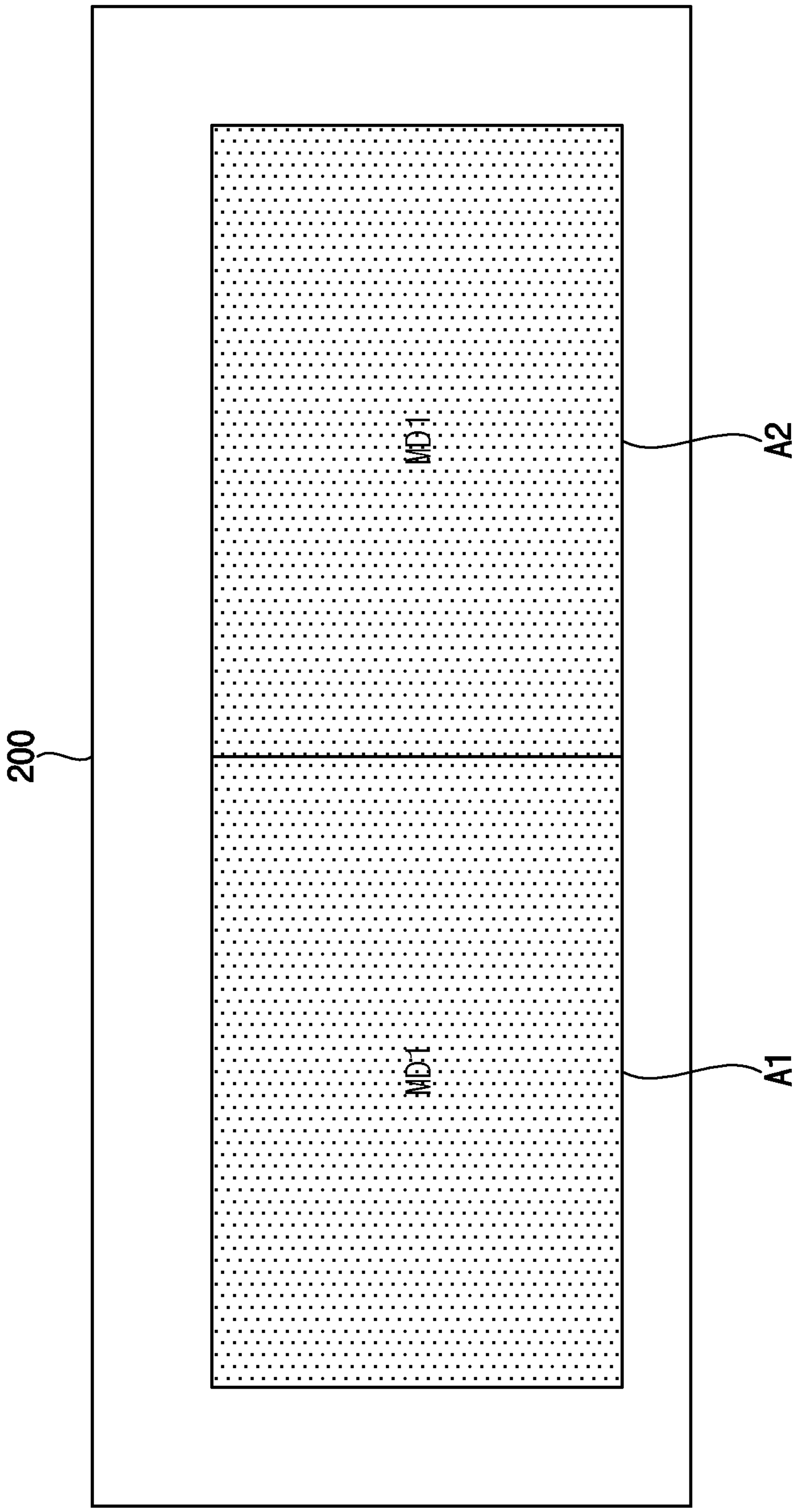
FIGS. 8, 9, 10, and 11 are diagrams for describing a driving of the display panel in FIG. 7 according to some embodiments.

Referring to FIGS. 7 and 8, according to some embodiments, the first area A1 and the second area A2 may be driven in the first mode MD1. In this case, the first public gate signal GS1_PU having the turn-on voltage level may be provided to the pixels PX in the first area A1, and the second public gate signal GS2_PU having the turn-on voltage level may be provided the pixels PX in the second area A2. Accordingly, the first area A1 and the second area A2 may display an image at the first viewing angle.

Figure 9:
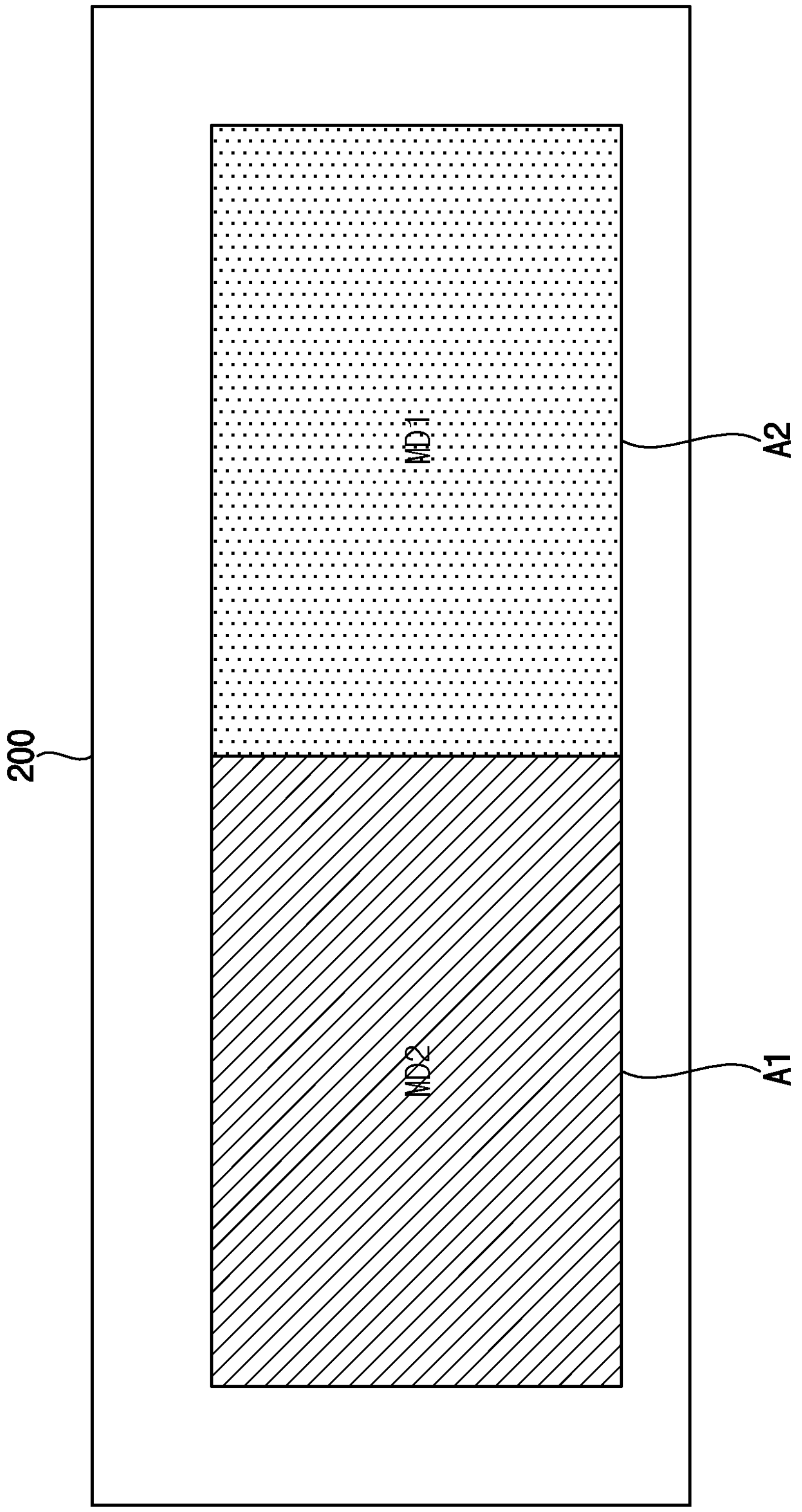

Referring to FIGS. 7 and 9, according to some embodiments, the first area A1 may be driven in the second mode MD2, and the second area A2 may be driven in the first mode MD1. In this case, the first public gate signal GS1_PU having the turn-off voltage level and the first private gate signal GS1_PR having the turn-on voltage level may be provided to the pixels PX in the first area A1, and the second public gate signal GS2_PU having the turn-on voltage level may be provided to the pixels PX in the second area A2. Accordingly, the first area A1 may display an image at the second viewing angle, and the second area A2 may display an image at the first viewing angle.

Figure 10:
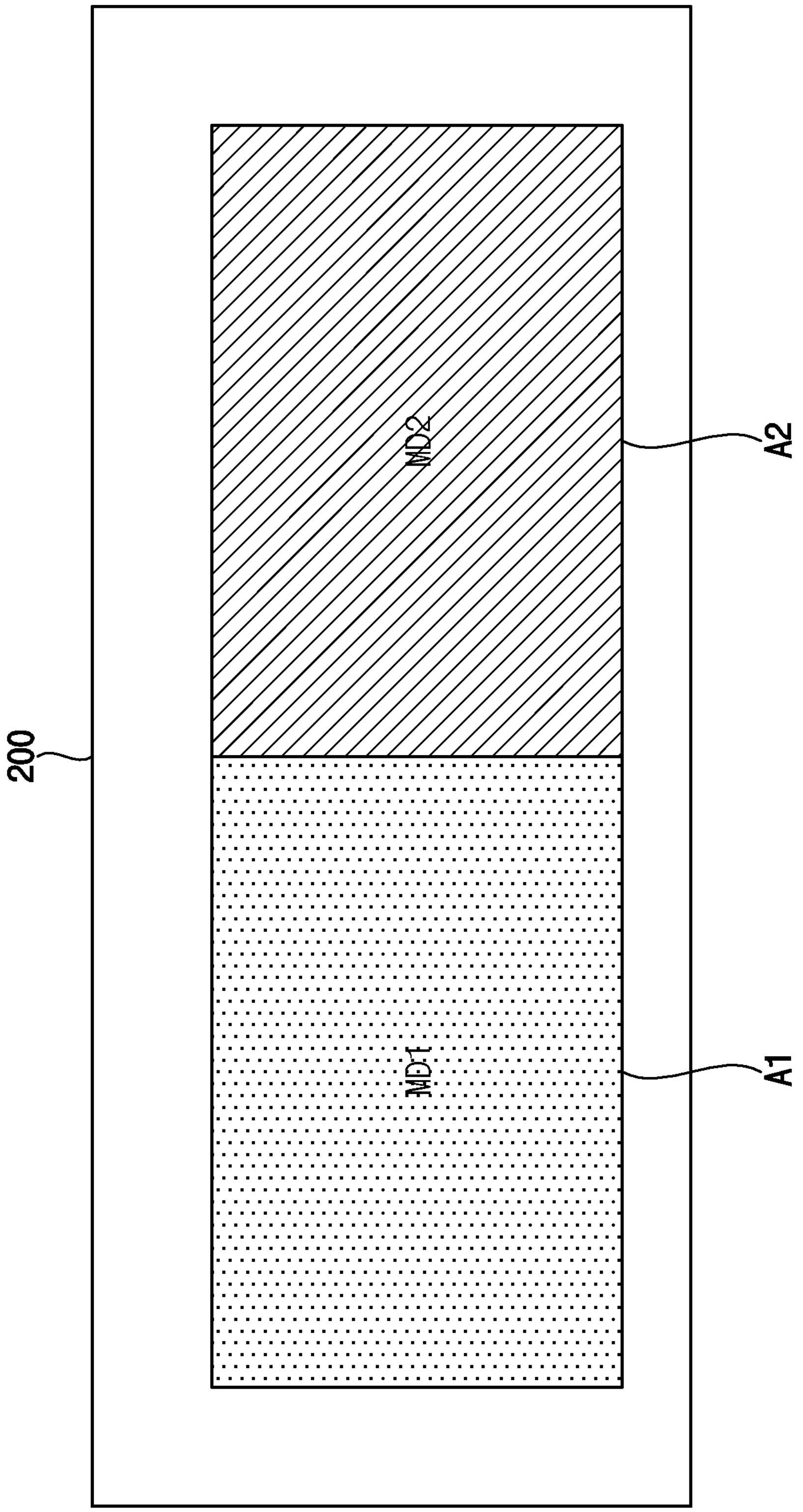

Referring to FIGS. 7 and 10, according to some embodiments, the first area A1 may be driven in the first mode MD1, and the second area A2 may be driven in the second mode MD2. In this case, the first public gate signal GS1_PU having the turn-on voltage level may be provided to the pixels PX in the first area A1, and the second public gate signal GS2_PU having the turn-off voltage level and the second private gate signal GS2_PR having the turn-on voltage level may be provided the pixels PX in the second area A2. Accordingly, the first area A1 may display an image at the first viewing angle, and the second area A2 may display an image at the second viewing angle.

Figure 11:
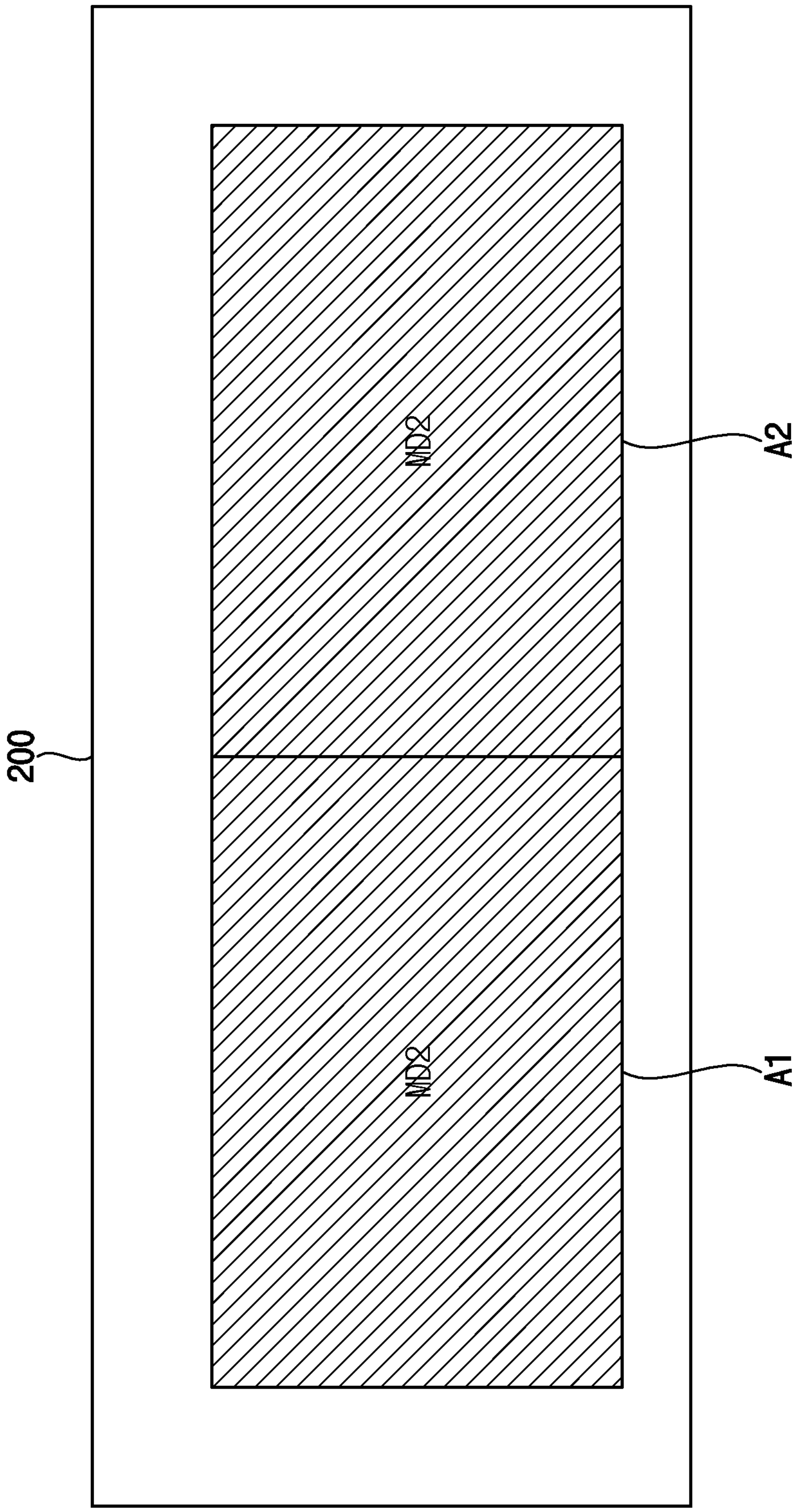

Referring to FIGS. 7 and 11, according to some embodiments, the first area A1 and the second area A2 may be driven in the second mode MD2. In this case, the first public gate signal GS1_PU having the turn-off voltage level and the first private gate signal GS1_PR having the turn-on voltage level may be provided to the pixels PX in the first area A1, and the second public gate signal GS2_PU having the turn-off voltage level and the second private gate signal GS2_PR having the turn-on voltage level may be provided to the pixels PX in the second area A2. Accordingly, the first area A1 and the second area A2 may display an image at the second viewing angle.

Figure 12:
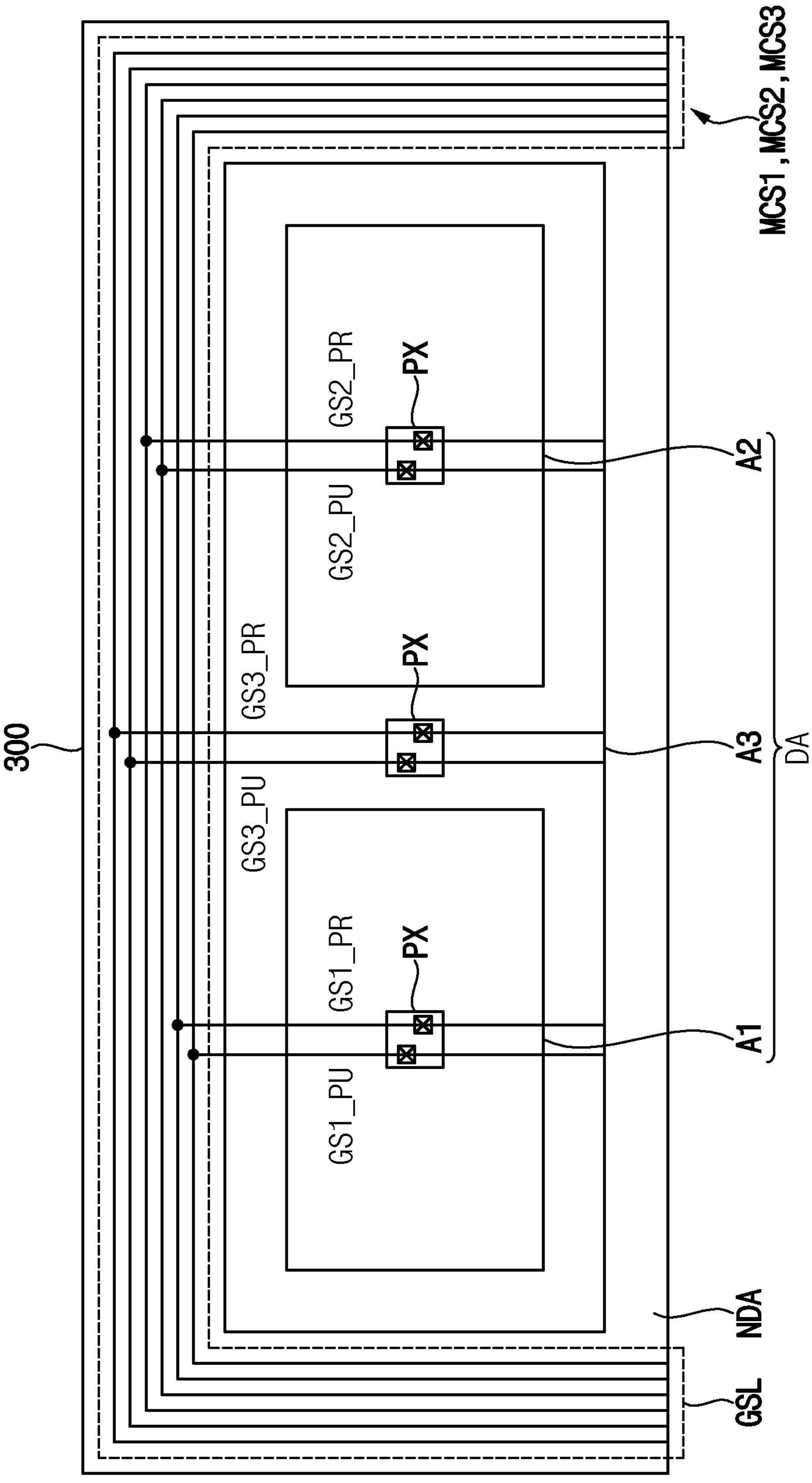
FIG. 12 is a plan view illustrating a display panel according to some embodiments.

FIG. 12 is a plan view illustrating a display panel 300 according to some embodiments. The display panel 300 in FIG. 12 may be an example of the display panel 110 included in the display device 100 in FIG. 1.

Descriptions of components of the display panel 300 described with reference to FIG. 12, which are substantially the same as or similar to those of the display panel 200 described with reference to FIG. 7, will be omitted.

Referring to FIGS. 1 and 12, the display area DA of the display panel 300 may include a first area A1, a second area A2, and a peripheral area A3, and each of the first area A1, the second area A2, and the peripheral area A3 may include a plurality of pixels PX. In other words, the display area DA may be divided into the first area A1, the second area A2, and the peripheral area A3. The peripheral area A3 may surround the first area A1 and the second area A2.

The mode driver 150 may provide a first mode control signal MCS1, a second mode control signal MCS2, and a third mode control signal MCS3 to the global signal lines GSL located in the non-display area NDA. The third mode control signal MCS3 may include a third public gate signal GS3_PU and a third private gate signal GS3_PR. The third public gate signal GS3_PU and the third private gate signal GS3_PR may be provided to the pixels PX in the peripheral area A3 through the global signal lines GSL.

The peripheral area A3 may be driven in the first mode or the second mode based on the third mode control signal MCS3. The peripheral area A3 may be driven in the first mode based on the third public gate signal GS3_PU, and may be driven in the second mode based on the third private gate signal GS3_PR. Accordingly, the first area A1, the second area A2, and the peripheral area A3 may be driven in the first mode or the second mode independently from each other.

According to some embodiments, the peripheral area A3 may be driven only in the first mode. In this case, the third public gate signal GS3_PU having the turn-on voltage level may be provided to the pixels PX in the peripheral area A3. Accordingly, the peripheral area A3 may display an image at the first viewing angle.

Figure 13:
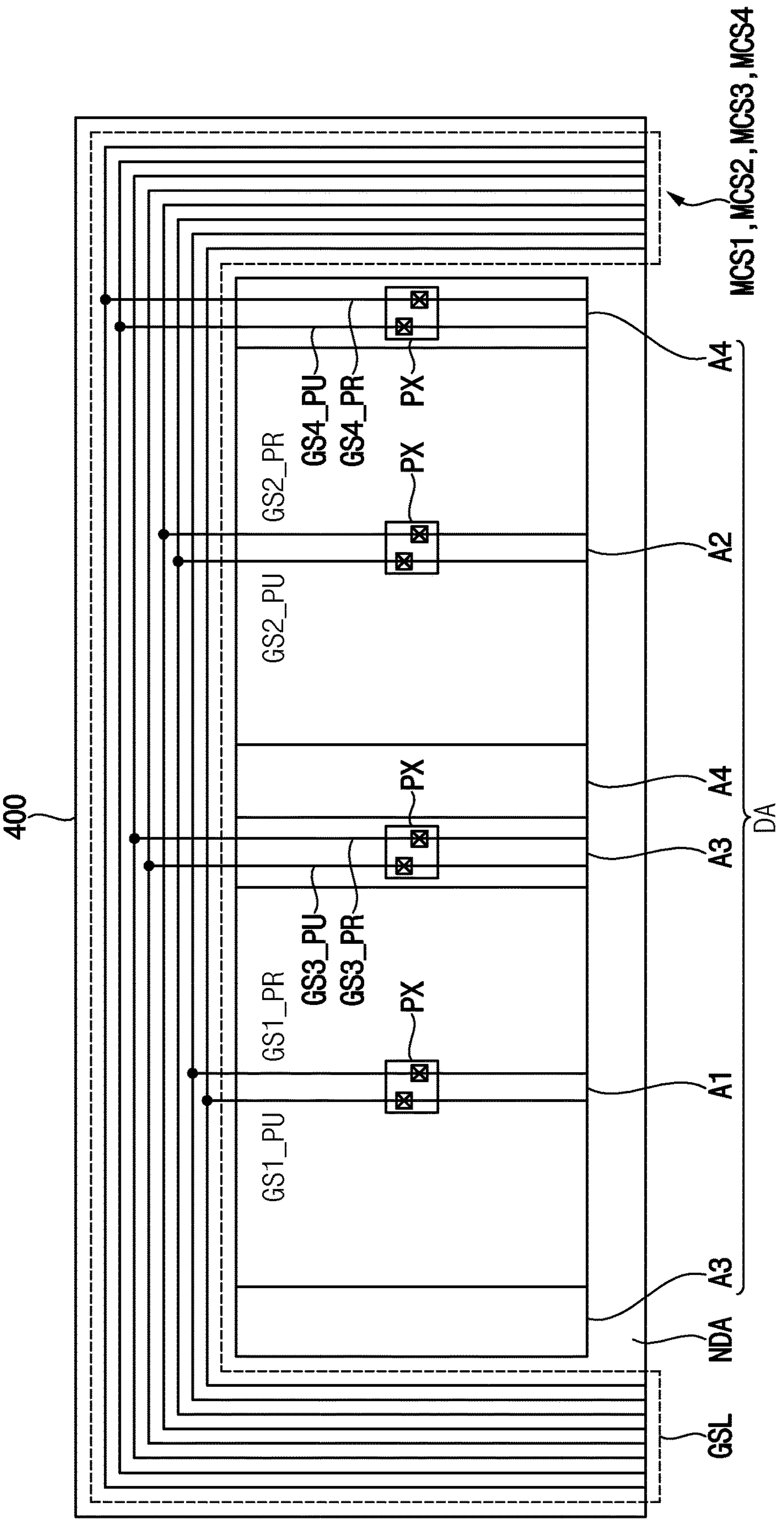
FIG. 13 is a plan view illustrating a display panel according to some embodiments.

FIG. 13 is a plan view illustrating a display panel 400 according to some embodiments. The display panel 400 in FIG. 13 may be an example of the display panel 110 included in the display device 100 in FIG. 1.

Descriptions of components of the display panel 400 described with reference to FIG. 13, which are substantially the same as or similar to those of the display panel 200 described with reference to FIG. 7, will be omitted.

Referring to FIGS. 1 and 13, the display area DA of the display panel 300 may include a first area A1, a second area A2, a first side area A3, and a second side area A4, and each of the first area A1, the second area A2, the first side area A3, and the second side area A4 may include a plurality of pixels PX. In other words, the display area DA may be divided into the first area A1, the second area A2, the first side area A3, and the second side area A4. The first side area A3 may be adjacent to at least one side of the first area A1, and the second side area A4 may be adjacent to at least one side of the second area A2. According to some embodiments, as illustrated in FIG. 13, the first side area A3 may be adjacent to opposite sides of the first area A1, and the second side area A4 may be adjacent to opposite sides of the second area A2.

The mode driver 150 may provide a first mode control signal MCS1, a second mode control signal MCS2, a third mode control signal MCS3, and a fourth mode control signal MCS4 to the global signal lines GSL located in the non-display area NDA. The third mode control signal MCS3 may include a third public gate signal GS3_PU and a third private gate signal GS3_PR, and the fourth mode control signal MCS4 may include a fourth public gate signal GS4_PU and a fourth private gate signal GS4_PR. The third public gate signal GS3_PU and the third private gate signal GS3_PR may be provided to the pixels PX in the first side area A3 through the global signal lines GSL, and the fourth public gate signal GS4_PU and the fourth private gate signal GS4_PR may be provided to the pixels PX in the second side area A4 through the global signal lines GSL.

The first side area A3 may be driven in the first mode or the second mode based on the third mode control signal MCS3. The first side area A3 may be driven in the first mode based on the third public gate signal GS3_PU, and may be driven in the second mode based on the third private gate signal GS3_PR. The second side area A4 may be driven in the first mode or the second mode based on the fourth mode control signal MCS4. The second side area A4 may be driven in the first mode based on the fourth public gate signal GS4_PU, and may be driven in the second mode based on the fourth private gate signal GS4_PR. Accordingly, the first area A1, the second area A2, the first side area A3, and the second side area A4 may be driven in the first mode or the second mode independently from each other.

Figure 14:
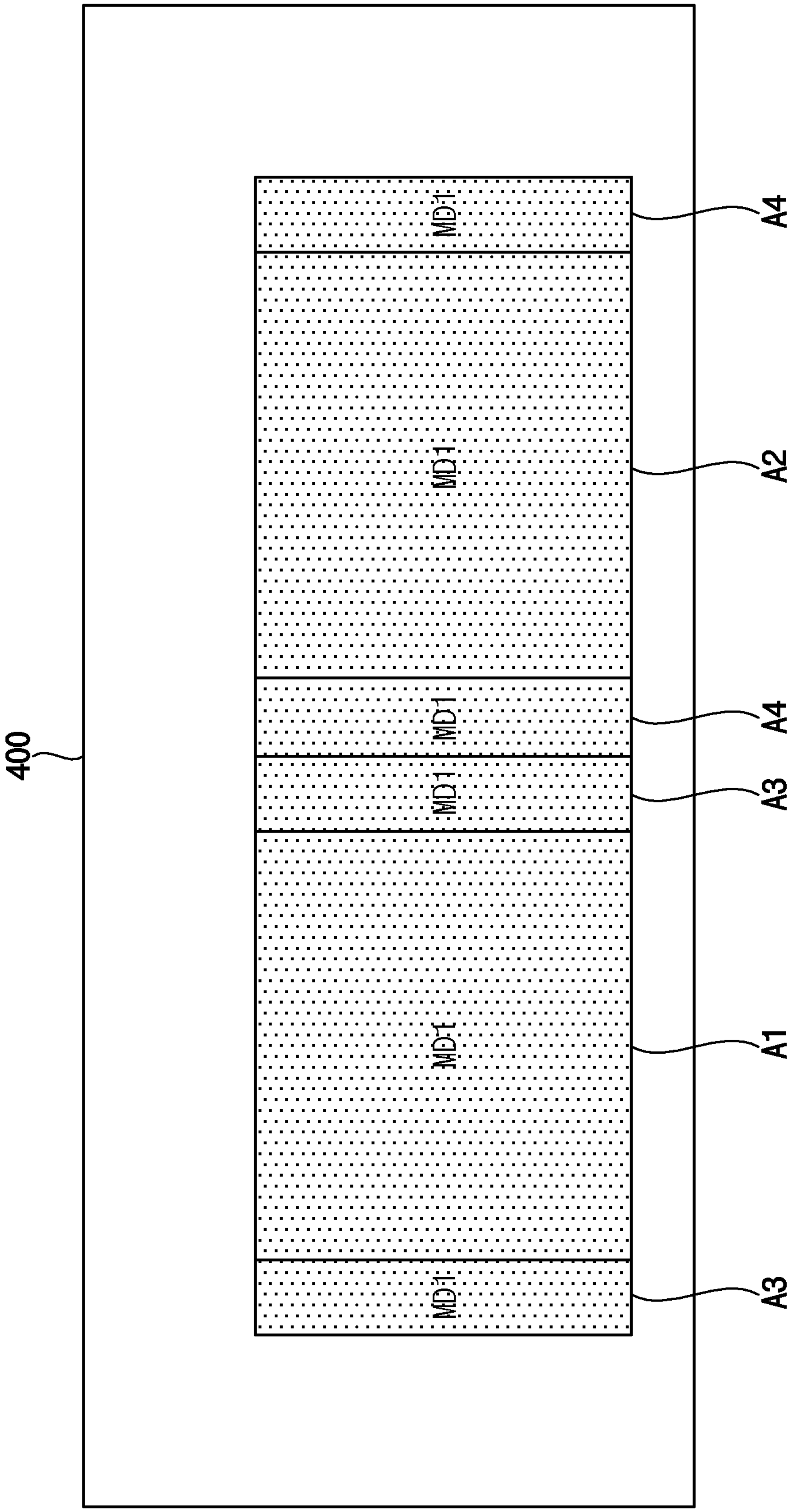
FIGS. 14, 15, and 16 are diagrams for describing a driving of the display panel in FIG. 13 according to some embodiments.
Figure 15:
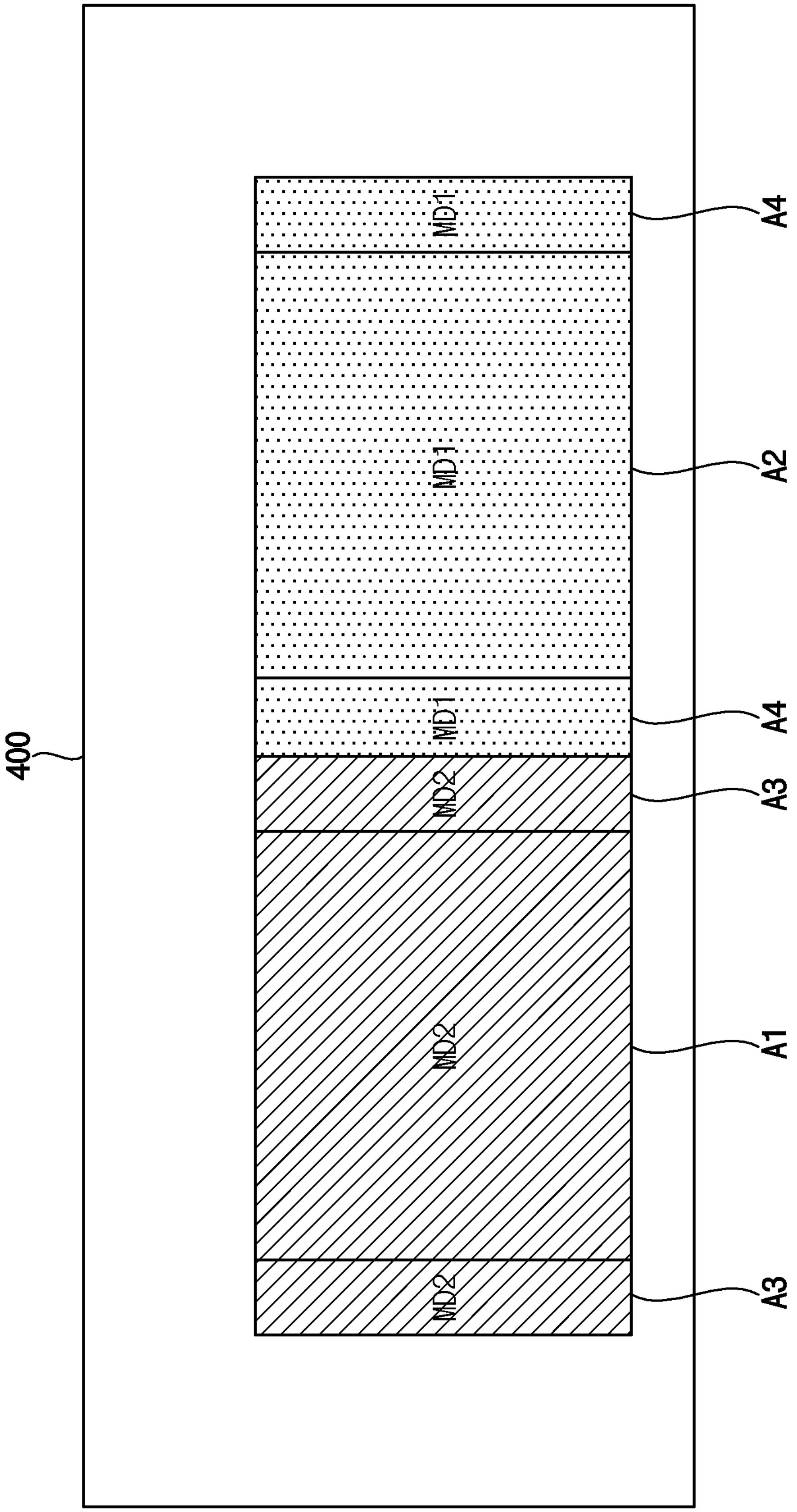
Figure 16:
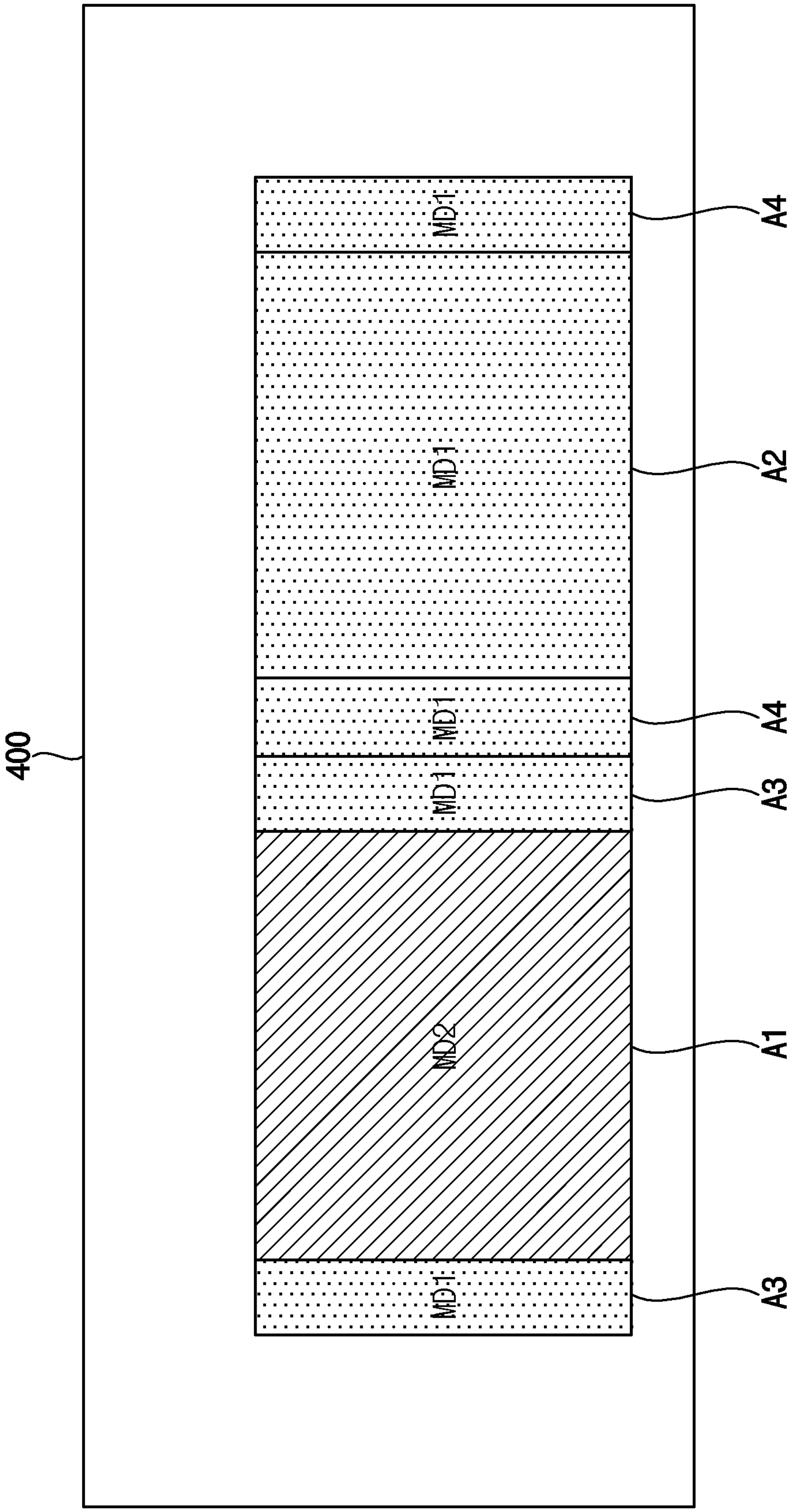

FIGS. 14, 15, and 16 are diagrams for describing a driving of the display panel 400 in FIG. 13 according to some embodiments.

Referring to FIGS. 13 and 14, according to some embodiments, the first side area A3 is driven only in the first mode MD1 when the first area A1 is driven in the first mode MD1. In other words, the first side area A3 may not be driven in the second mode MD2 when the first area A1 is driven in the first mode MD1. In this case, the first public gate signal GS1_PU having the turn-on voltage level may be provided to the pixels PX in the first area A1, and the third public gate signal GS3_PU having the turn-on voltage level may be provided to the pixels PX in the first side area A3. Accordingly, the first area A1 and the first side area A3 may display an image at the first viewing angle.

Referring to FIGS. 13, 15, and 16, according to some embodiments, the first side area A3 may be driven in the first mode MD1 or the second mode MD2 when the first area A1 is driven in the second mode MD2. In this case, the first public gate signal GS1_PU having the turn-off voltage level and the first private gate signal GS1_PR having the turn-on voltage level may be provided to the pixels PX in the first area A1.

According to some embodiments, as illustrated in FIG. 15, the third public gate signal GS3_PU having the turn-off voltage level and the third private gate signal GS3_PR having the turn-on voltage level may be provided the pixels PX in the first side area A3 when the first side area A3 is driven in the second mode MD2. Accordingly, the first area A1 and the first side area A3 may display an image at the second viewing angle. For example, the display panel 400 may display an image at the second viewing angle having a 21:9 ratio through the first area A1 and the first side area A3.

According to some embodiments, as illustrated in FIG. 16, the third public gate signal GS3_PU having the turn-on voltage level may be provided to the pixels PX in the first side area A3 when the first side area A3 is driven in the first mode MD1. Accordingly, the first area A1 may display an image at the second viewing angle, and the first side area A3 may display an image at the first viewing angle. For example, the display panel 400 may display an image at the second viewing angle having a 16:9 ratio through the first area A1.

FIGS. 14, 15, and 16 illustrate that the second area A2 and the second side area A4 are driven in the first mode MD1, but the second area A2 and the second side area A4 may be driven substantially the same as or similar to the first area A1 and the first side area A3, respectively. According to some embodiments, the second side area A4 may be driven only in the first mode MD1 when the second area A2 is driven in the first mode MD1. According to some embodiments, the second side area A4 may be driven in the first mode MD1 or the second mode MD2 when the second area A2 is driven in the second mode MD2.

Figure 17:
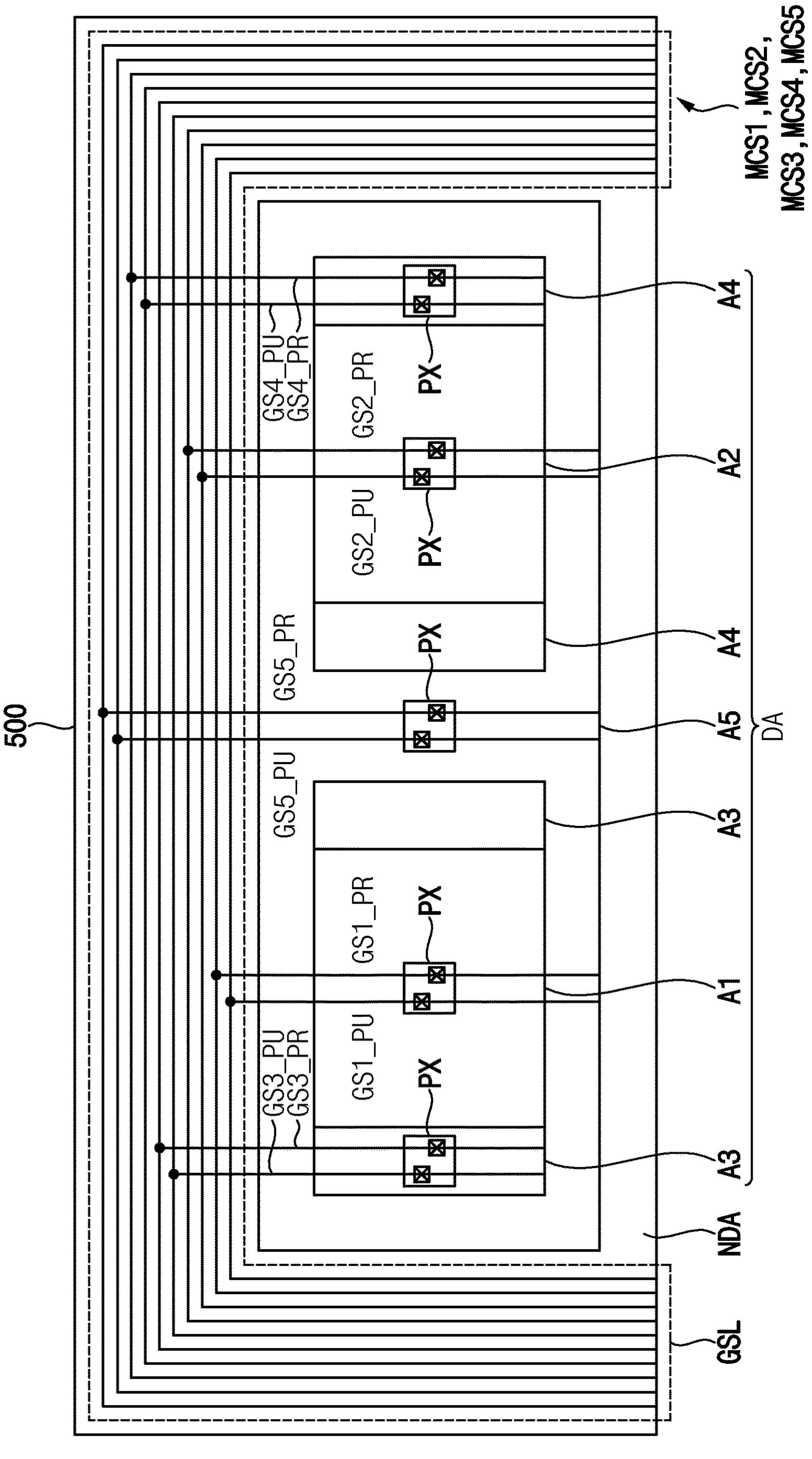
FIG. 17 is a plan view illustrating a display panel according to some embodiments.

FIG. 17 is a plan view illustrating a display panel 500 according to some embodiments. The display panel 500 in FIG. 17 may be an example of the display panel 110 included in the display device 100 in FIG. 1.

Descriptions of components of the display panel 500 described with reference to FIG. 17, which are substantially the same as or similar to the display panel 200 described with reference to FIG. 7 and the display panel 400 described with reference to FIG. 13, may be omitted.

Referring to FIGS. 1 and 17, the display area DA of the display panel 500 may include a first area A1, a second area A2, a first side area A3, a second side area A4, and a peripheral area A5, and each of the first area A1, the second area A2, the first side area A3, the second side area A4, and the peripheral area A5 may include a plurality of pixels PX. In other words, the display area DA may be divided into the first area A1, the second area A2, the first side area A3, the second side area A4, and the peripheral area A5. The peripheral area A5 may surround the first area A1, the second area A2, the first side area A3, and the second side area A4.

The mode driver 150 may provide a first mode control signal MCS1, a second mode control signal MCS2, a third mode control signal MCS3, a fourth mode control signal MCS4, and a fifth mode control signal MCS5 to the global signal lines GLS located in the non-display area NDA. The fifth mode control signal MCS5 may include a fifth public gate signal GS5_PU and a fifth private gate signal GS5_PR. The fifth public gate signal GS5_PU and the fifth private gate signal GS5_PR may be provided to the pixels PX in the peripheral area A5 through the global signal lines GSL.

The peripheral area A5 may be driven in the first mode or the second mode based on the fifth mode control signal MCS5. The peripheral area A5 may be driven in the first mode based on the fifth public gate signal GS5_PU, and may be driven in the second mode based on the fifth private gate signal GS5_PR. Accordingly, the first area A1, the second area A2, the first side area A3, the second side area A4, and the peripheral area may be driven in the first mode or the second mode independently from each other.

According to some embodiments, the peripheral area A5 may be driven only in the first mode. In this case, the fifth public gate signal GS5_PU having the turn-on voltage level may be provided to the pixels PX in the peripheral area A5. Accordingly, the peripheral area A5 may display an image at the first viewing angle.

Figure 18:
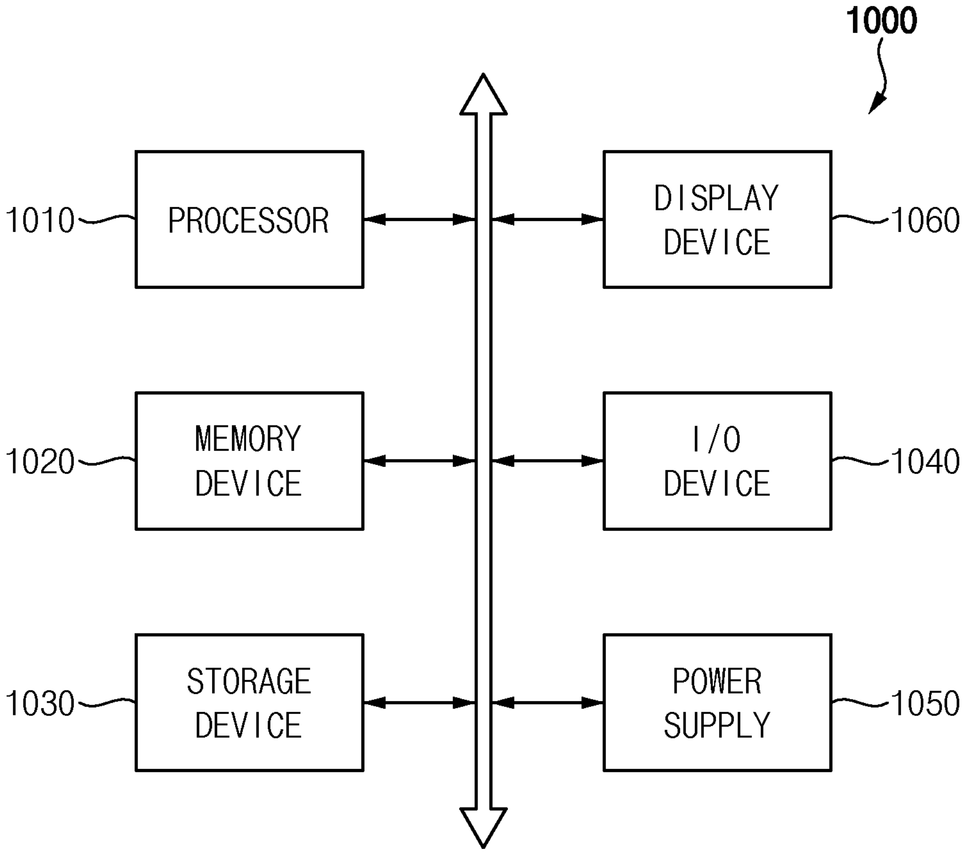
FIG. 18 is a block diagram illustrating an electronic apparatus according to some embodiments.
Figure 19:
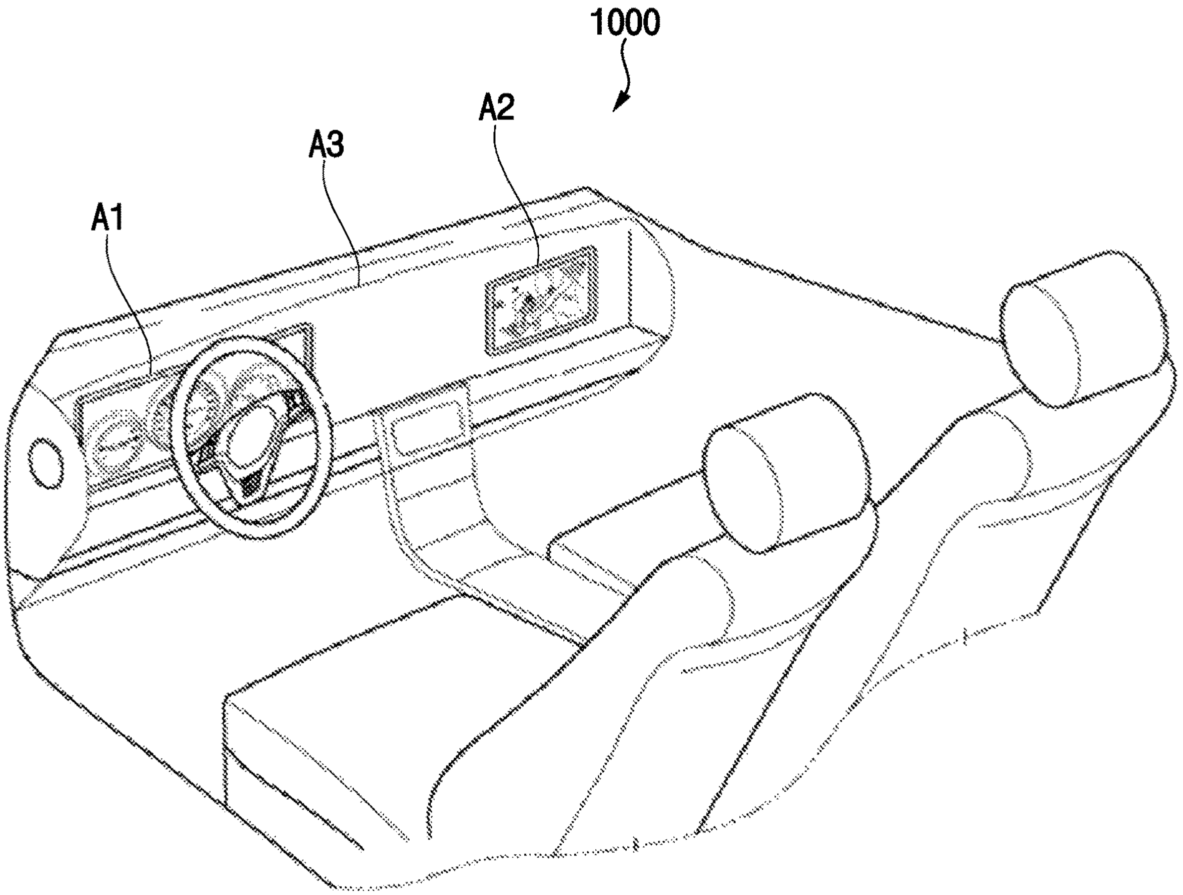
FIG. 19 is a diagram illustrating an example in which the electronic apparatus in FIG. 18 is implemented as automobile display system according to some embodiments.

FIG. 18 is a block diagram illustrating an electronic apparatus 1000 according to some embodiments. FIG. 19 is a diagram illustrating an example in which the electronic apparatus 1000 in FIG. 18 is implemented as an automobile display system.

Referring to FIGS. 18 and 19, the electronic apparatus 1000 may include a processor 1010, a memory device 1020, a storage device 1030, an input/output ("I/O") device 1040, a power supply 1050, and the display device 1060. The display device 1060 may correspond to the display device 100 in FIG. 1. The electronic apparatus 1000 may further include a plurality of ports for communicating with a video card, a sound card, a memory card, a universal serial bus ("USB") device, etc.

According to some embodiments, as illustrated in FIG. 19, the electronic apparatus 1000 may be implemented as an automatic display system. For example, the electronic apparatus 1000 may include a first area A1, a second area A2, and a peripheral area A3, and the first area A1, the second area A2, and the peripheral area A3 may correspond to the first area A1, the second area A2, and the peripheral area A3 of the display panel 300 in FIG. 12, respectively. However, embodiments according to the present disclosure are not limited thereto, and according to some embodiments, the electronic apparatus 1000 may be implemented as a television, a mobile phone, a video phone, a smart pad, a smart watch, a tablet PC, an automatic navigation, a laptop, a head mounted display device, etc.

The processor 1010 may perform calculations or tasks. According to some embodiments, the processor 1010 may be a microprocessor, a central processing unit ("CPU"), or the like. The processor 1010 may be coupled to other components via an address bus, a control bus, a data bus, or the like. According to some embodiments, the processor 1010 may be coupled to an extended bus such as a peripheral component interconnection ("PCI") bus. According to some embodiments, the processor 1010 may provide the first image data IMD1 in FIG. 1 and the control signal CNT in FIG. 1 to the display device 1060.

The memory device 1020 may store data for operations of the electronic apparatus 1000. According to some embodiments, the memory device 1020 may include a non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or a volatile memory device such as a dynamic random access memory ("DRAM") device, a static random access memory ("SRAM") device, a mobile DRAM device, etc.

The storage device 1030 may include a solid-state drive ("SSD") device, a hard disk drive ("HDD") device, a CD-ROM device, or the like. The I/O device 1040 may include an input device such as a keyboard, a keypad, a touchpad, a touchscreen, a mouse device, etc., and an output device such as a speaker, a printer, etc. The power supply 1050 may supply a power required for the operation of the electronic apparatus 1000. The display device 1060 may be coupled to other components via the buses or other communication links.

In the display device 360, areas of a display panel may be independently driven based on mode control signals, respectively, so that each of the areas may be independently driven in a first mode (public mode) displaying a wide viewing angle image or a second mode (private mode) displaying a narrow viewing angle image.

The display device according to the embodiments may be applied to a display device included in an automobile display system, a computer, a notebook, a mobile phone, a smart phone, a smart pad, a PMP, a PDA, an MP3 player, or the like.

Although aspects of display devices according to some embodiments have been described with reference to the drawings, the illustrated embodiments are examples, and may be modified and changed by a person having ordinary knowledge in the relevant technical field without departing from the technical spirit described in the following claims, and their equivalents.

What is claimed is:

1. A display device, comprising:

a display panel including a first area and a second area; and a panel driver configured to drive the display panel, to provide a first mode control signal to pixels in the first area, and to provide a second mode control signal to pixels in the second area, wherein the first area is configured to be driven in a first mode to display an image having a first viewing angle or a second mode to display an image having a second viewing angle narrower than the first viewing angle based on the first mode control signal, and wherein the second area is configured to be driven in the first mode or the second mode based on the second mode control signal, wherein the display panel further includes a first side area adjacent to at least one side of the first area, wherein the panel driver is configured to provide a third mode control signal to pixels in the first side area, wherein the first side area is configured to be driven in the first mode or the second mode based on the third mode control signal, and wherein the first side area is configured to be driven in the first mode or the second mode based on the first area being driven in the second mode.

2. The display device of claim 1, wherein the first area and the second area are configured to be driven in the first mode or the second mode independently from each other.

3. The display device of claim 1, wherein each of the first mode control signal and the second mode control signal includes a public gate signal and a private gate signal, wherein each of the first area and the second area is configured to be driven in the first mode based on the public gate signal, and wherein each of the first area and the second area is configured to be driven in the second mode based on the private gate signal.

4. The display device of claim 3, wherein each of the pixels in the first and second areas includes:

a first light emitting element configured to emit light with the first viewing angle;

a second light emitting element configured to emit light with the second viewing angle;

an emission transistor configured to be turned-on in response to an emission signal;

a first mode control transistor connected between the first light emitting element and the emission transistor and configured to be turned-on in response to the public gate signal; and a second mode control transistor connected between the second light emitting element and the emission transistor and configured to be turned-on in response to the private gate signal.

5. The display device of claim 4, wherein, in the second mode, the first light emitting element is configured to not emit light, and the second light emitting element is configured to emit light.

6. The display device of claim 5, wherein, in the first mode, the first light emitting element is configured to emit light, and the second light emitting element is configured to not emit light.

7. The display device of claim 5, wherein, in the first mode, the first light emitting element is configured to emit light, and the second light emitting element is configured to emit light.

8. The display device of claim 4, wherein each of the pixels in the first and second areas further includes:

a driving transistor connected between a driving voltage line and a first node and which includes a gate electrode connected to a second node;

a write transistor connected between a data voltage line and a third node and configured to be turned-on in response to a write gate signal;

a compensation transistor connected between the first node and the second node and configured to be turned-on in response to a compensation gate signal;

an initialization transistor connected between a first initialization voltage line and the second node and configured to be turned-on in response to an initialization gate signal;

a reference transistor connected between a reference voltage line and the third node and configured to be turned-on in response to the compensation gate signal;

a first capacitor connected between the second node and the third node; and a second capacitor connected between the driving voltage line and the third node.

9. The display device of claim 8, wherein each of the pixels in the first and second areas further includes:

a first bypass transistor connected between a second initialization voltage line and a fourth node between the first light emitting element and the first mode control transistor and configured to be turned-on in response to a bypass gate signal; and a second bypass transistor connected between the second initialization voltage line and a fifth node between the second light emitting element and the second mode control transistor and configured to be turned-on in response to the bypass gate signal.

10. The display device of claim 1, wherein the display panel further includes a peripheral area surrounding the first area and the second area, wherein the panel driver is configured to provide a fourth mode control signal to pixels in the peripheral area, and wherein the peripheral area is configured to be driven in the first mode or the second mode based on the fourth mode control signal.

11. The display device of claim 1, wherein the display panel further includes a peripheral area surrounding the first area and the second area, wherein the peripheral area is configured to be driven in the first mode only.

12. The display device of claim 1, wherein the display panel further includes a second side area adjacent to at least one side of the second area, wherein the panel driver is configured to provide a fourth mode control signal to pixels in the second side area, and wherein the second side area is configured to be driven in the first mode or the second mode based on the fourth mode control signal.

13. The display device of claim 12, wherein the display panel further includes a peripheral area surrounding the first area, the second area, the first side area, and the second side area, wherein the panel driver is configured to provide a fifth mode control signal to pixels in the peripheral area, and wherein the peripheral area is configured to be driven in the first mode or the second mode based on the fifth mode control signal.

14. The display device of claim 1, wherein the panel driver includes:

a scan driver configured to provide scan signals to the pixels in the first and second areas;

an emission driver configured to provide emission signals to the pixels in the first and second areas;

a data driver configured to provide data voltages to the pixels in the first and second areas; and a mode driver configured to provide the first mode control signal to the pixels in the first area and to provide the second mode control signal to the pixels in the second area.

15. A display device, comprising:

a display panel including a first area and a second area; and a panel driver configured to drive the display panel, to provide a first mode control signal to pixels in the first area, and to provide a second mode control signal to pixels in the second area, wherein the first area is configured to be driven in a first mode to display an image having a first viewing angle or a second mode to display an image having a second viewing angle narrower than the first viewing angle based on the first mode control signal, and wherein the second area is configured to be driven in the first mode or the second mode based on the second mode control signal, wherein the display panel further includes a first side area adjacent to at least one side of the first area, wherein the panel driver is configured to provide a third mode control signal to pixels in the first side area, and wherein the first side area is configured to be driven in the first mode or the second mode based on the third mode control signal wherein the first side area is configured to be driven in the first mode only based on the first area being driven in the first mode.

16. A display device, comprising:

a display panel including a plurality of pixels and which is divided into first to kth areas, where n is a natural number greater than or equal to 2; and a panel driver configured to drive the display panel and to provide first to kth mode control signals to the first to $k^{th}$ areas, respectively, wherein each of the first to $k^{th}$ mode control signals includes a public gate signal and a private gate signal, and wherein each of the pixels includes:

a first light emitting element configured to emit light with a first viewing angle;

a second light emitting element configured to emit light with a second viewing angle narrower than the first viewing angle;

an emission transistor configured to be turned-on in response to an emission signal;

a first mode control transistor connected between the first light emitting element and the emission transistor and configured to be turned-on in response to the public gate signal; and a second mode control transistor connected between the second light emitting element and the emission transistor and configured to be turned-on in response to the private gate signal, wherein the display panel further includes a first side area adjacent to at least one side of the first area, wherein the panel driver is configured to provide a side area mode control signal to pixels in the first side area, wherein the first side area is configured to be driven in a first mode or a second mode based on the side area mode control signal, and wherein the first side area is configured to be driven in the first mode or the second mode based on the first area being driven in the second mode.

17. The display device of claim 16, wherein the first to $k^{th}$ mode control signals are independent from each other.

18. The display device of claim 16, wherein each of the pixels further includes:

a driving transistor connected between a driving voltage line and a first node and which includes a gate electrode connected to a second node;

a write transistor connected between a data voltage line and a third node and configured to be turned-on in response to a write gate signal;

a compensation transistor connected between the first node and the second node and configured to be turned-on in response to a compensation gate signal;

an initialization transistor connected between a first initialization voltage line and the second node and configured to be turned-on in response to an initialization gate signal;

a reference transistor connected between a reference voltage line and the third node and configured to be turned-on in response to the compensation gate signal;

a first capacitor connected between the second node and the third node; and a second capacitor connected between the driving voltage line and the third node.

19. An electronic apparatus, comprising:

a display device which displays an image; and a processor which provides image data to the display device, wherein the display device includes:

a display panel including a first area and a second area; and a panel driver configured to drive the display panel, to provide a first mode control signal to pixels in the first area, and to provide a second mode control signal to pixels in the second area, wherein the first area is configured to be driven in a first mode to display an image having a first viewing angle or a second mode to display an image having a second viewing angle narrower than the first viewing angle based on the first mode control signal, wherein the second area is configured to be driven in the first mode or the second mode based on the second mode control signal, wherein the display panel further includes a first side area adjacent to at least one side of the first area, wherein the panel driver is configured to provide a third mode control signal to pixels in the first side area, wherein the first side area is configured to be driven in the first mode or the second mode based on the third mode control signal, and wherein the first side area is configured to be driven in the first mode or the second mode based on the first area being driven in the second mode.

* * * * *